United States Patent [19]

Murata et al.

[11] Patent Number: 5,987,402
[45] Date of Patent: Nov. 16, 1999

[54] SYSTEM AND METHOD FOR EFFICIENTLY RETRIEVING AND TRANSLATING SOURCE DOCUMENTS IN DIFFERENT LANGUAGES, AND OTHER DISPLAYING THE TRANSLATED DOCUMENTS AT A CLIENT DEVICE

[75] Inventors: Toshiki Murata; Hideki Yamamoto, both of Tokyo, Japan

[73] Assignee: Oki Electric Industry Co., Ltd., Tokyo, Japan

[21] Appl. No.: 08/588,414

[22] Filed: Jan. 18, 1996

[30] Foreign Application Priority Data

Jan. 31, 1995 [JP] Japan .................................. 7-013831
Jan. 31, 1995 [JP] Japan .................................. 7-013832
Jan. 31, 1995 [JP] Japan .................................. 7-013990

[51] Int. Cl.$^6$ .................................................. G06F 17/28
[52] U.S. Cl. ............................................................ 704/2
[58] Field of Search ................................. 704/2, 5, 7, 8, 704/1; 707/536

[56] References Cited

U.S. PATENT DOCUMENTS

| | | |
|---|---|---|
| 4,870,610 | 9/1989 | Belfer . |
| 5,140,522 | 8/1992 | Ito et al. . |
| 5,268,839 | 12/1993 | Kaji . |
| 5,295,068 | 3/1994 | Nishino et al. . |
| 5,307,265 | 4/1994 | Winans . |
| 5,497,319 | 3/1996 | Chong et al. . |
| 5,546,304 | 8/1996 | Marschner et al. . |
| 5,548,508 | 8/1996 | Nagami . |
| 5,587,902 | 12/1996 | Kugimiya . |
| 5,689,671 | 11/1997 | Stromberg . |
| 5,751,957 | 5/1998 | Hiroya et al. . |
| 5,778,380 | 7/1998 | Siefert . |
| 5,852,798 | 12/1998 | Ikuta et al. . |

FOREIGN PATENT DOCUMENTS 5-28240  2/1993  Japan .

OTHER PUBLICATIONS

Kim et al., "A presentation agent for multilingual services", 1994 IEEE Network Operations and Management Symposium, vol. 2, Feb. 14–17, 1994, pp. 635–644.

IBM Technical Disclosure Bulletin, vol. 36, No. 9B, Sep. 1993.

IBM Technical Disclosure Bulletin, vol. 37, No. 1, Jan. 1994.

Alonso et al., Remote access to the METAL translation system, Intelligent Text and Image Handling, Proceedings of a Conference, Apr. 1991, pp. 491–513.

W. J. Hutchins and H.L. Somers, "An Introduction to Machine Translation", Academic Press, 1991, pp. 175–189.

N. Ishikawa and M. Hiyama, "English–Japanese machine translation supporting system on tagged text," CALS Japan '94.

*Primary Examiner*—Robert A. Weinhardt
*Attorney, Agent, or Firm*—Wenderoth, Lind & Ponack, L.L.P.

[57] ABSTRACT

A document retrieval and display system for retrieving source documents in different languages from servers linked by a communication network, translating the retrieved source documents as necessary, storing the translated documents, and displaying the source documents and translated documents at a client device connected to the communication network. The translation process is activated automatically by a control module, and is carried out by a machine translation module. The control module decides when a translation is necessary, selects whether to display the source document or a translated document at the client device, and determines when the source document has been updated and must be retranslated.

28 Claims, 24 Drawing Sheets

FIG. 16

```
|                    RETRANSFER | QUIT |
| File to translate: _____         |
|                                      |
```

FIG. 17

```
|                    RETRANSFER | QUIT |
| File to refrieve: _____          |
|                                      |
```

FIG. 29

| TRANSLATION | RETRANSFER | QUIT |

File to retrieve: _____

FIG. 30

| TRANSLATION | RETRANSFER | QUIT |

日本の工業製品の紹介
LSI
自動車
薬

FIG. 31

| SOURCE TEXT | RETRANSFER | QUIT |

Introduction to Japanese industrial products
LSI
Cars
Medicine

END OF TRANSLATION

FIG. 32

| TRANSLATION | RETRANSFER | QUIT |

LSIは、産業の米である。
LSIの原料はシリコンである。

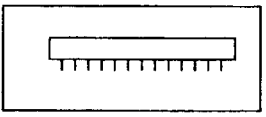

FIG. 33

| SOURCE TEXT | RETRANSFER | QUIT |

LSI is the rice of industry.

TRANSLATION
IN PROGRESS

FIG. 34

| SOURCE TEXT | RETRANSFER | QUIT |

LSI is the rice of industry.
The raw material of LSI is silicon.

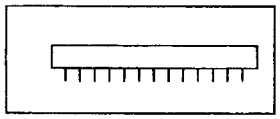

END OF TRANSLATION

SYSTEM AND METHOD FOR EFFICIENTLY RETRIEVING AND TRANSLATING SOURCE DOCUMENTS IN DIFFERENT LANGUAGES, AND OTHER DISPLAYING THE TRANSLATED DOCUMENTS AT A CLIENT DEVICE

BACKGROUND OF THE INVENTION

The present invention relates to a document retrieval and display system having a translation function, and more particularly to a system for retrieving documents in different languages through a communication network and translating and displaying the retrieved documents.

Document retrieval and display systems are used to obtain many types of information from computer networks. Some systems employ linked documents (also known as hypertext), which enable a user to retrieve information by tracing links from one document to another. This can usually be done simply by selecting certain tagged words or items in the document on display with a pointing device.

The documents need not all be stored in the same place. A network may have many document storage sites, each with an associated server for finding stored documents and sending them where they are required.

Particularly in international networks, some retrieved documents may be in a foreign language which the user cannot easily read, or cannot read at all. However, machine translation systems are available which can translate documents from one language to another. A user can use a document retrieval and display system to retrieve information in one language, then use a machine translation system to have the information translated into another language.

A problem in translating linked documents by machine is that tags linking the documents to other documents may be embedded directly in the document text. There exist machine translation systems, however, that can recognize tags and other non-textual elements and transfer them from the source document to the appropriate points in the translated document without attempting to translate them.

By combining these known arts, a person should be able to retrieve a linked document in a foreign language, have it translated by machine and displayed in his native language, then use the tags embedded in the translated document to retrieve further documents. In practice, however, this turns out to be a slow and inconvenient process, for the following reasons.

First, the document retrieval system and machine translation system are separate and independent systems. After using the retrieval system to retrieve a document from a network, the user may have to send the document back through to the same or a different network to the machine translation system to have it translated. In the worst case, the retrieved document may have to be physically transported from the retrieval site to the machine translation site. Even if the user can access both the retrieval and machine translation services from the same personal computer or other computing device, the user must still go through the work of accessing two separate systems and transferring documents from one system to the other. This will be true even if the machine translation system runs on the user's own personal computer.

Second, suppose that upon reading the translated version of a linked document in a foreign language, the user finds in it a link to a further document that he wants to read. The user must then transfer the translated document back to the retrieval system so that he can use the information embedded in the translated document to request the further document. This is not only inconvenient, but with some retrieval systems it may be impossible, in which case the user must compare the original and translated versions of the document to identify the position of the link in the original document, and request the further linked document by pointing to the link in the original document. This is a difficult task if the original document is in a language the user cannot read.

In either case the further linked document will usually be in the same foreign language, so the user must once again go through the process of transferring the retrieved document from the retrieval system to the machine translation system to have it translated. If the user attempts to trace a chain of links from one document to the next, these problems arise at every link in the chain. Instead of being able to skip from one document to another simply by pointing to tagged items in the documents, the user must expend much time and energy in transferring documents back and forth between the retrieval system and machine translation system.

A third problem is that the document normally cannot be transferred from the retrieval system to the machine translation system until it has been completely received. Receiving a long document may take some time. Transferring the document from the retrieval system to the machine translation system also takes time, so there is a considerable delay in getting the translation process started.

A fourth problem is that the retrieval and display system does not know when a user has had a retrieved document translated, and has no way of furnishing the translated version of the document to other users who may request it. If requested by many users, the same document may end up being machine-translated into the same language many times, and many users will have to wait for a long time to get translations of documents which, unknown to them, have already been translated in the past.

A fifth problem is that neither the retrieval and display system nor the machine translation system provides any means of telling when a translation has gone out of date. A user who has had a source document translated may continue to use the translated document after the source document has been updated, unaware that the translation is no longer valid.

The first, third, fourth, and fifth problems also arise in systems that retrieve non-linked documents.

SUMMARY OF THE INVENTION

It is accordingly an object of the present invention to enable users to obtain translated versions of retrieved documents with little or no extra effort.

Another object of the invention is to provide translated versions of retrieved documents as quickly as possible.

Yet another object is to avoid unnecessary retranslations of the same document.

Still another object is to maintain consistency between source documents and translated documents.

Yet another object is to facilitate linked access to documents in foreign languages.

The invented document retrieval and display system retrieves source documents in different languages from servers located at different sites in a communication network, translates the retrieved source documents as necessary, and displays the source documents and translated documents at a client device connected to the communication network. The system has, in addition to the servers and client device, a translation module for translating documents between at least two languages, a storage facility for storing the resulting translated documents, and a control module. The control module determines when a translation is necessary, automatically activates the translation module to have the translation performed, and decides whether to display the source document or a translated version thereof at the client device.

The control module may be located in the client device, at the site of one of the servers, or at a point in the communication network between the client device and the servers. In the last case, the client device communicates with the servers through the control module.

BRIEF DESCRIPTION OF THE DRAWINGS

FIG. 16 illustrates an initial screen displayed in the fifth embodiment.

FIG. 17 illustrates another initial screen displayed in the fifth embodiment.

FIG. 29 illustrates an initial screen displayed in the ninth embodiment.

FIG. 30 illustrates the display of a source document in the ninth embodiment.

FIG. 31 illustrates the display of a translated document in the ninth embodiment.

FIG. 32 illustrates the display of a further source document linked to the source document in FIG. 30.

FIG. 33 illustrates the display of a translation-in-progress of the further source document in FIG. 32.

FIG. 34 illustrates the display of the completed translation.

DETAILED DESCRIPTION OF THE INVENTION

Embodiments of the invention will be described with reference to the attached illustrative drawings. The term "document" will refer to information of any type stored in machine-readable form in a memory or other storage facility of a computing system.

First embodiment

Figure 1:
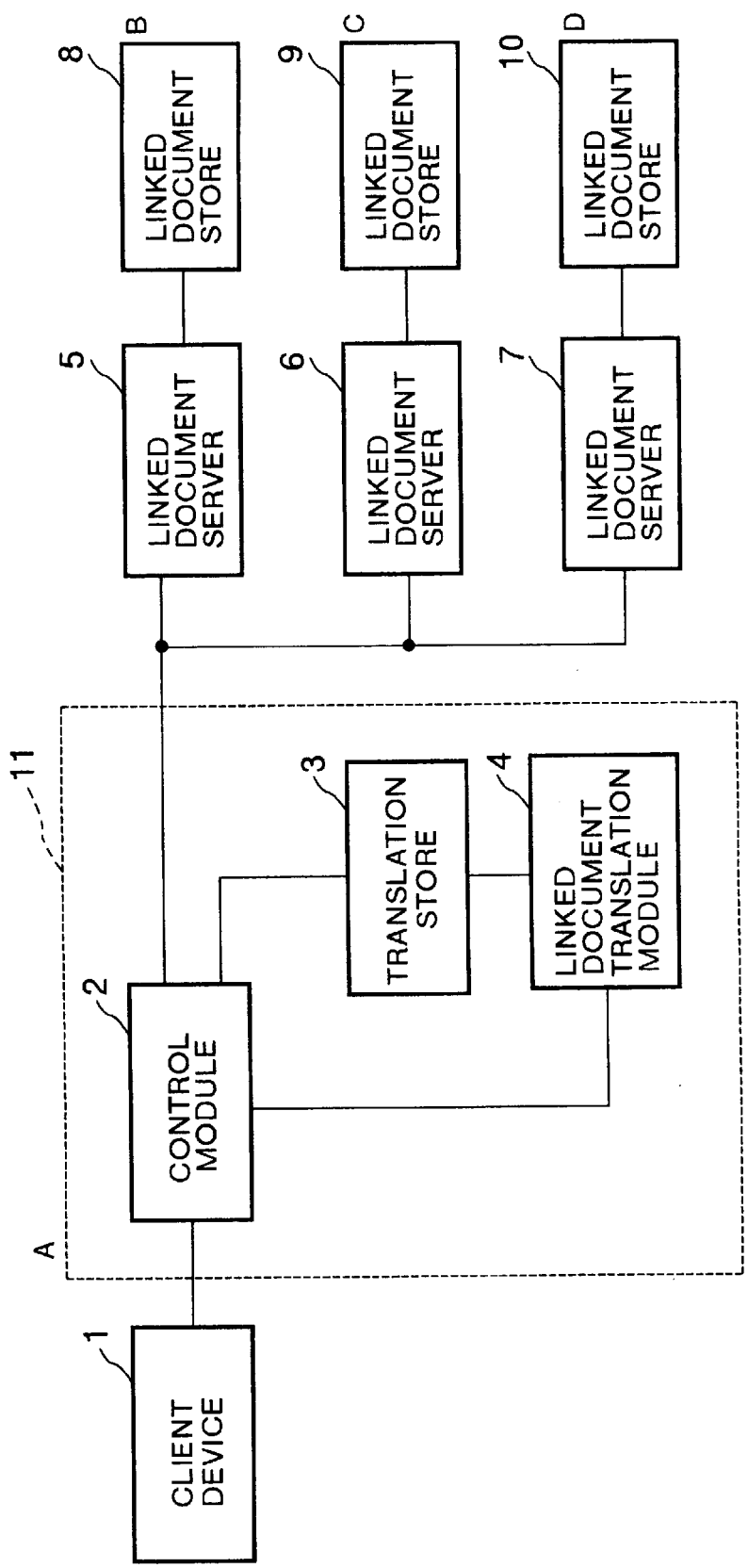
FIG. 1 is a block diagram of a first embodiment of the invention.

Referring to FIG. 1, the first embodiment comprises a client device 1, a control module 2, a translation store 3, a translation module 4, a plurality of linked document servers 5, 6, and 7, and a corresponding plurality of linked document stores 8, 9, and 10.

The client device 1 is, for example, a personal computer running software by which the user can gain access to the linked document servers 5, 6, and 7. The software may be, for example, a so-called client program, a browser, or a general-purpose communication program. The first embodiment permits use of conventional software at the client device 1. The client device is disposed at a user site in the communication network.

Although the drawings will show only one client device 1, normally many such client devices will be connected to the system. Each user of the system may have a separate client device, or a client device may be shared by several users.

The control module 2, translation store 3, and translation module 4 constitute a linked document translation system 11. The control module 2 controls the translation store 3 and translation module 4. The control module 2 and translation module 4 comprise suitable software running on different computing systems or, preferably, as separate processes on the same computing system at a translation control site A. This computing system acts as a gateway through which multiple client device users gain access to the linked document servers 5, 6, and 7. The control module 2 is therefore connected to a plurality of client devices, not just the one shown in the drawing.

The client device 1 is connected through the control module 2 to the linked document servers 5, 6, and 7 in a transparent manner, meaning that the client device 1 and the linked document servers 5, 6, and 7 can communicate with each other as if they were directly connected, without noticing the presence of the control module 2. The computing system on which the control module 2 runs has communication ports, buffer memory, and other well-known facilities not explicitly indicated in the drawing.

The translation store 3 is a storage facility comprising, for example, a magnetic or optical disk on which information can be stored. The translation store 3 stores translated documents produced by the translation module 4.

The translation module 4 is a machine translation system with dictionaries and other facilities for translating documents between two languages in both directions. The translation module 4 is capable of recognizing non-textual information, such as tags specifying links to other documents, and transferring such non-textual information, without modification, from the original document to the translated document.

The linked document servers 5, 6, and 7 are computer programs that run on different computing systems located at separate server sites B, C, and D. The linked document stores 8, 9, and 10 are located at these same server sites. The linked document stores 8, 9, and 10 comprise, for example, storage facilities with magnetic or optical disks on which documents are stored. The documents are in various languages. The linked document servers 5, 6, and 7 find and transfer requested documents. The first embodiment permits the use of conventional linked document servers and stores.

The client device 1, control module 2, and linked document servers 5, 6, and 7 are interconnected by a communication network represented by interconnecting lines in the drawing. There is no restriction on the size of the communication network, the type of interconnecting links, or the network topology, except that the client device 1 must access all servers through the control module 2. The number of servers need not be three and may be greater than or less than three. The part of the communication network interconnecting the servers may have a bus topology (as shown), or a ring topology, star topology, mesh topology, or any other network topology.

Next, the operation of the client device 1 when the user accesses the linked document retrieval and display system will be described.

Figure 2:
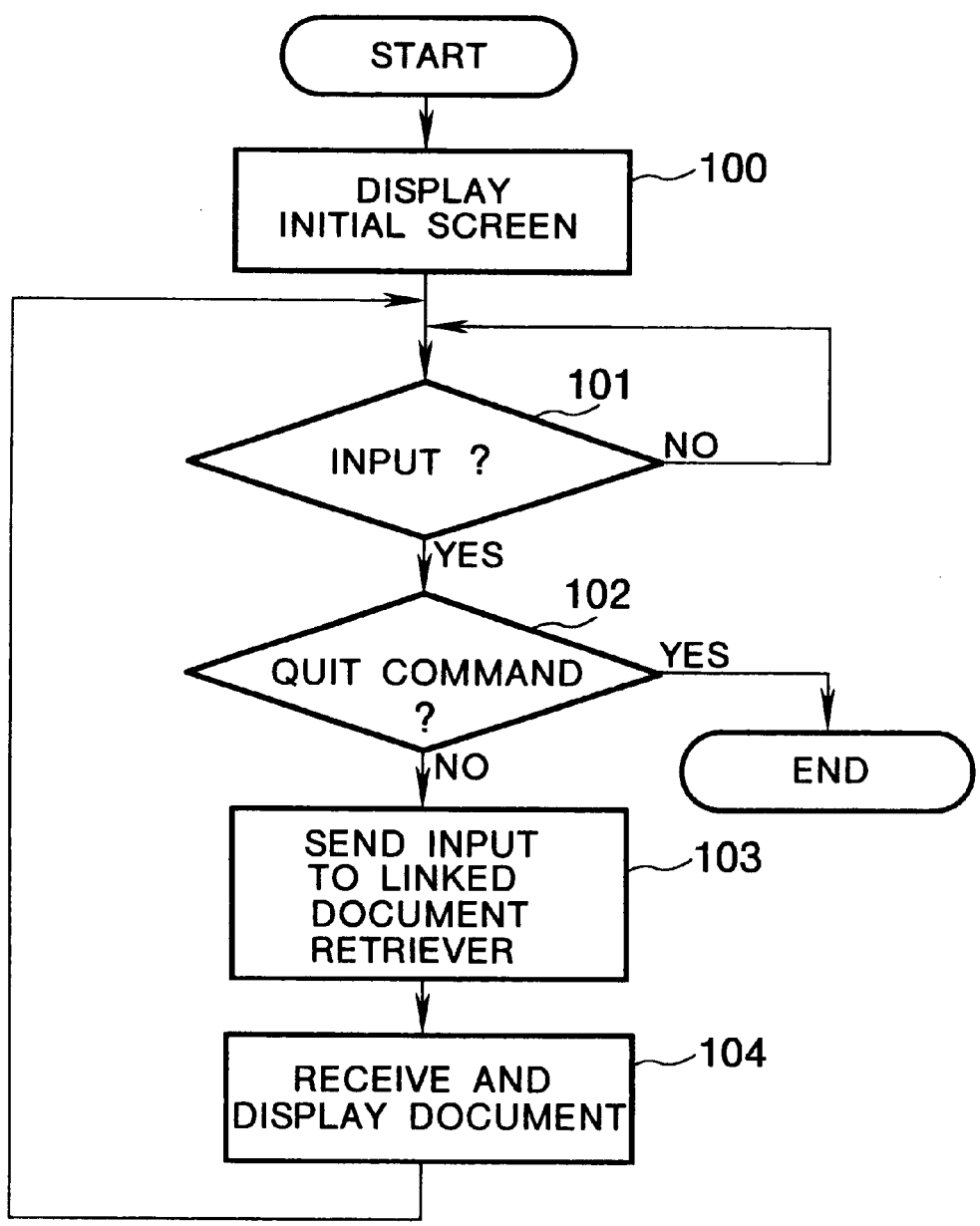
FIG. 2 is a flowchart illustrating a process executed by the client device in the first embodiment.

Referring to FIG. 2, when the user accesses the retrieval and display system, the client device 1 first displays an initial input screen (step 100), then waits for input from the user (step 101). This input may be a file descriptor designating a document to be retrieved, or it may be a command such as "Quit." If the "Quit" command is given, access to the retrieval and display system is terminated (step 102). If the input is a file descriptor, it is sent to the appropriate linked document server (step 103), and then the requested document is received and displayed (step 104). The file descriptor and document are actually sent and received via the control module 2, but the user at the client device 1 need not be aware of this.

After step 104, the process returns to step 101 to wait for further input, for example, such as for the user to request a further document linked to the document now on display.

Next, the operation of the linked document servers (e.g. the linked document server 5) will be described.

Figure 3:
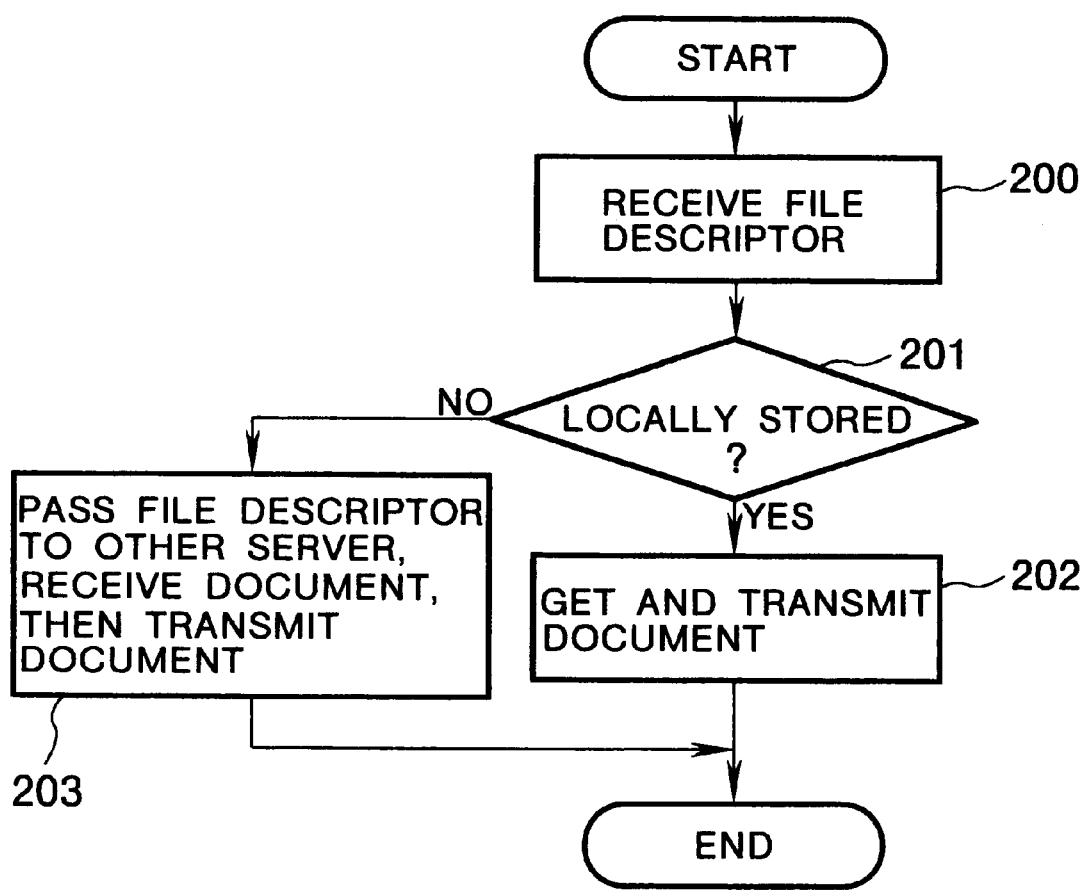
FIG. 3 is a flowchart illustrating a process executed by the linked document servers in the first embodiment.

The linked document server 5 repeatedly executes the process shown in FIG. 3. Multiple copies of this process may be executed concurrently, permitting different documents to be retrieved and sent to different users at the same time.

The process starts with the reception of a file descriptor, which originated at a client device as described above and the request of a document (step 200). From the file descriptor, the linked document server 5 determines whether or not the requested document is stored in the linked document store 8 at the same site B (step 201).

If the requested document is stored in this linked document store 8, the linked document server 5 gets tile document out of the linked document store 8 and transmits it over the network toward the site from which it was requested (step 202). If the document is stored in another linked document store 9 or 10, the linked document server 5 sends the file descriptor to the corresponding linked document server 6 or 7, receives the document that this linked document server 6 or 7 sends back, and transmits the document on toward the site from which it was requested (step 203).

In a network with a bus topology as shown in FIG. 1, it will normally not be necessary to execute step 203, as all document requests can be sent directly to the site where the document is stored. In other network topologies, however, the document request may have to pass through servers at one or more intermediate sites before reaching the destination site, and the document may have to be returned over the same path, in which case step 203 will be executed at each intermediate site on the path.

Next, the operation of the control module 2 will be described.

Figure 4:
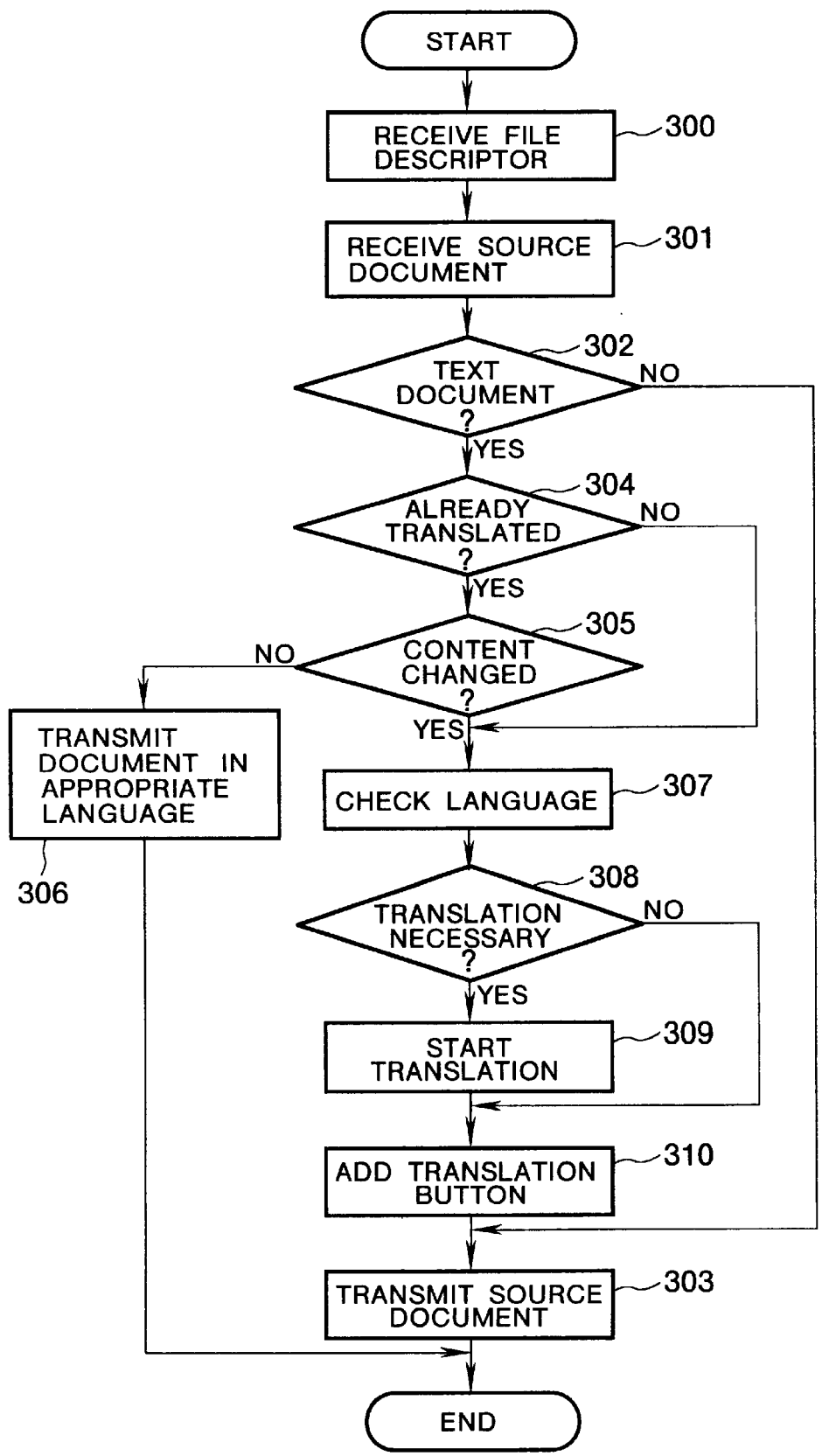
FIG. 4 is a flowchart illustrating a process executed by the control module in the first embodiment.

The control module 2 repeatedly executes the process shown in FIG. 4. Multiple copies of this process may be executed concurrently, enabling the control module 2 to handle multiple document requests at the same time.

The process begins with the reception of a file descriptor from the client device 1, requesting a document (step 300). The control module 2 examines the file descriptor, strips off translation-related information (if present), sends the remaining information onward to the appropriate linked document server 5, 6, or 7, and receives the requested document sent back from the linked document server 5, 6, or 7 (step 301). This returned document will be referred to below as the source document.

As the source document is received, the control module 2 stores it in a buffer memory. It will be assumed below that the document begins with a header containing attribute control information, including a version number or the date and time of the most recent update. This header is followed by the body of the document, which may comprise text or other matter, such as still pictures, a computer program, or a digitized audio or video signal. Non-text documents are identified as such in their headers.

The control module 2 checks the document header and determines whether or not the source document is a text document (step 302). This check can be made as soon as reception of the document begins; the control module 2 does not have to wait until the entire document is received. If the source document is not a text document, it is transmitted to the client device 1 without modification (step 303).

If the source document is a text document, next the control module 2 checks whether it has been translated before (step 304) by searching the directory of the translation store 3 to see if an old translated copy of the document is stored therein.

If an old translated document is found in the document store 3, the control module 2 checks whether there has been any change in the content of the source document since it was translated before (step 305). This check is made by comparing the headers of the source and translated documents, e.g. by comparing their version numbers, or their date and time information.

If the source document has not been changed or updated since it was translated, the control module 2 selects either the source document now being received or the old translated document stored in the translation store 3, and transmits the selected document to the client device 1 (step 306). If the file descriptor received in step 300 specifically requested a translated document stored in the translation store 3, the translated document is selected and transmitted. Otherwise, the source document is selected and transmitted.

If the source document has not been translated previously (a "no" result in step 304), or if it was translated previously but has been updated in the meantime (a "yes" result in step 305), the control module 2 checks the language of the source document (step 307). This check is preferably made by means of language-identifying information in the document header. If the header does not contain language-identifying information, the language can be identified by, for example, searching in the document for character codes characteristic of particular languages, or by attempting to look up some of the words in the document in dictionaries for different languages.

Next, the control module 2 decides whether or not a translation is necessary. If the source document is not in one of the two languages that the translation module 4 can translate, then translation is deemed unnecessary. Translation is also deemed unnecessary if it is recognized at this point that the same document has more recently been requested by another client device. In that case, a translation, possibly of a more recent version of the source document, will be produced in response to that more recent request, rendering a translation of the current source document unnecessary and possibly obsolete. In other cases, translation is deemed necessary, even if not explicitly requested at the client device 1.

If translation is necessary, the control module 2 activates the translation module 4 and has it translates the source document (step 309). The translation process takes place concurrently with the continuing steps performed by the control module 2, so that translation does not delay the display of the source document.

Next, if translation has been started in step 309, or if it is known that translation will be performed in response to a request from another client device, the control module 2 adds a "Translation" button to the source document (step 310). This "Translation" button is a tagged item displayed on the source document, as shown later, and is tagged with the file descriptor of the translated document that will be produced by the translation module 4. If the source document spans multiple pages (multiple display screens on the client device 1), the "Translation" button is preferably added so that it will appear on each page. For example, the "Translation" button can be sent to the client device 1 as a separate item to be displayed at the top of each page.

Finally, the control module 2 transmits the source document to the client device 1, which receives and displays it (step 303).

Next, the operation of the translation module 4 will be described.

Figure 5:
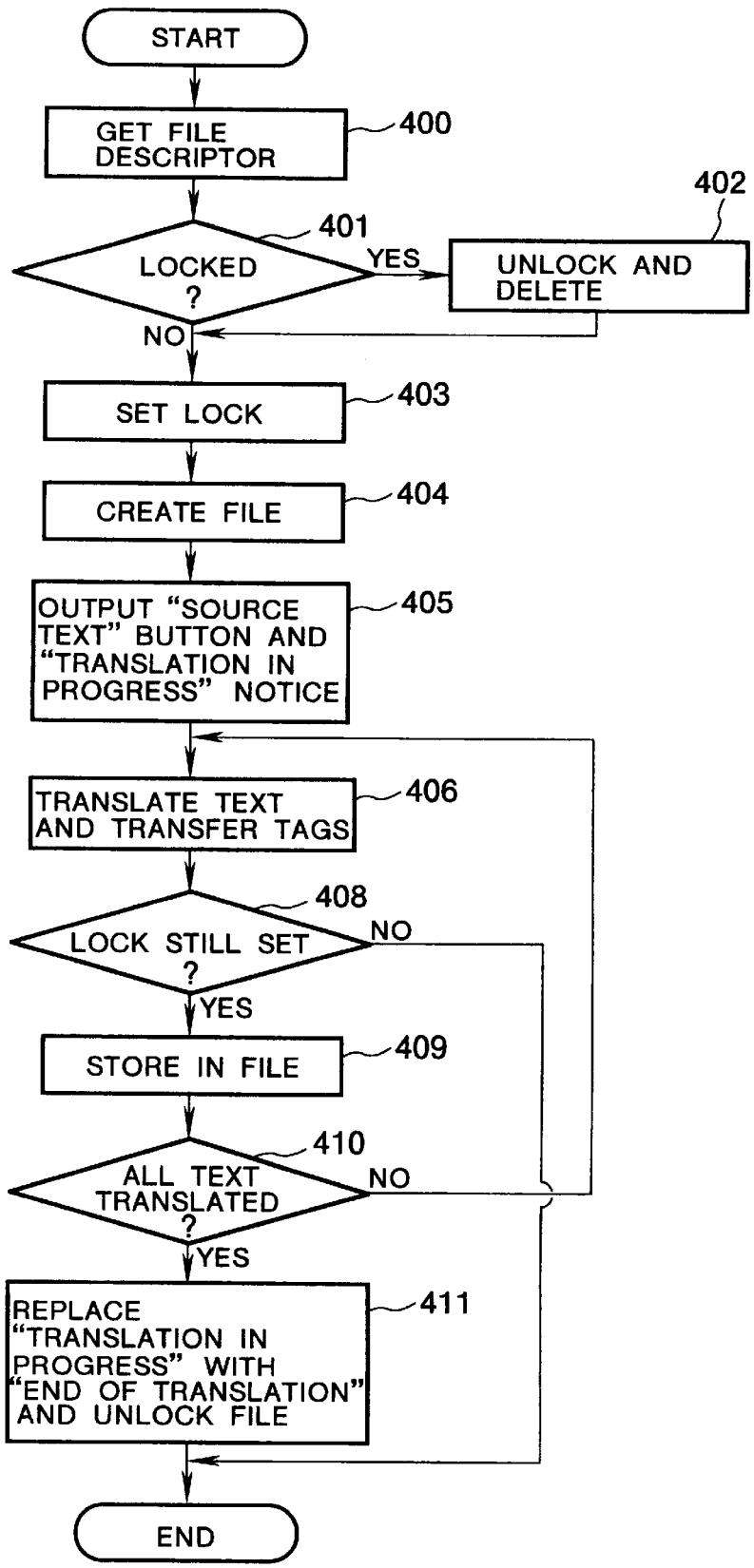
FIG. 5 is a flowchart illustrating a process executed by the translation module in the first embodiment.

The translation module 4 repeatedly executes the process shown in FIG. 5. Multiple copies of this process may be executed concurrently, enabling the translation module 4 to translate multiple documents at the same time. When multiple copies of the translation process are executed concurrently, each is identified by a separate process number.

The first step in this process is to get, from the control module 2, the file descriptor of the file in which the translated document will be stored (step 400). This descriptor gives the name and storage site of the source document, and has a prefix indicating the storage site and language of the translated document.

Next, this file descriptor is checked to see if it is already locked (step 401). As explained below, the translation process sets a lock specifying the descriptor of the file in which it is writing a translated document. The check in step 401 consists of determining if such a lock is already set for the file descriptor obtained in step 400.

If such a lock is set, indicating that the source document, or an earlier version thereof, is currently being translated by another copy of the translation process which was activated earlier, the lock is removed and the file containing the translation in progress is deleted (step (402).

Next a lock is set, specifying both the file descriptor obtained in step 400 and the process number of the current translation process (step 403). This lock enables the specified process to write in the specified file. The translation process will not write in a file which it does not have locked in this way.

With the lock set, the file that will receive the translation is now created by, for example, entering its file descriptor in the directory of the translation store 3 and allocating an initial amount of storage space (step 404). If a file with the same file descriptor already exists, the old translated document stored in this file is deleted at this point.

The newly created file is now opened for write access, and a "Source text" button and "Translation in progress" notice are written into the translated file (step 405). The "Source text" button is a tagged item that is tagged with the file descriptor of the source document. If the translated document has multiple pages, the "Source text" button is preferably displayed on each page. Header information is also written in the file at this point, including, for example, the version number of the source document, and the date and time of creation of the source document and/or translated document.

The translation module 4 now begins translating the source document to produce a new translated document (step 406). Only text is translated. Tags and other non-textual items that may be present in the source document are transferred without modification from the source document to the new translated document. As the translation proceeds, the non-textual items and translated text are placed in a buffer.

When a certain amount of material has been placed in the buffer, the lock set in step 403 is checked (step 408). If this lock is still set, the material in the buffer is written into the file created in step 404 (step 409). The written material is inserted in front of the "Translation in progress" notice, so that this notice always appears at the end of the file. If the lock is not set, the translation process is terminated at this point (the document is presumably now being translated by a more recently activated translation process).

A decision is next made as to whether all text in the source document has been translated (step 410). If not, the process returns to step 406 to continue translating. When all text has been translated, the "Translation in progress" notice is replaced with an "End of translation" notice, the file is closed, the lock is removed, and the translation process ends (step 411).

The purpose of setting and checking locks in steps 401 to 403 and 408 is to prevent access conflicts, and to ensure that if several users retrieve the same source document at about the same time, the translation will be made from the latest and newest copy of the source document.

The operation of the first embodiment will next be described by following a specific example of the retrieval and translation of linked documents. The translation module 4 in this example is capable of translating between English and Japanese. A Japanese text document named "Industry," listing Japanese industrial products, is stored in the linked document store 8 at site B. This document is linked to other Japanese text documents, describing specific industrial products, at sites B, C, and D.

Figure 6:
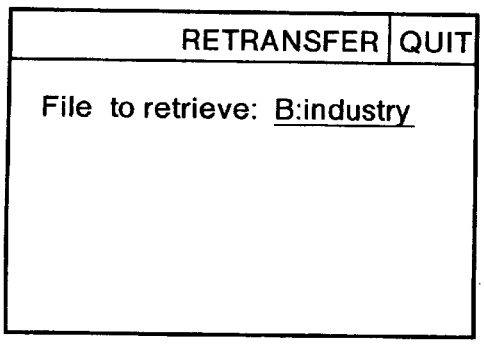
FIG. 6 illustrates an initial screen displayed by the client device in the first embodiment.

When the user first accesses the document retrieval and display system, he sees, for example, the initial input screen shown in FIG. 6. Various buttons appear at the top of this screen, including a "Quit" button and a "Retransfer" button. These buttons appear at the top of all screens displayed at the client device 1 during access to the retrieval and display system.

When the "Quit" button is operated with a pointing device such as a mouse, the client device 1 sends the "Quit" command described earlier.

The "Retransfer" button is initially inoperative, but each time the user retrieves a document, the file descriptor of that document is assigned to the "Retransfer" button. If the "Retransfer" button is operated, the most recently retrieved document will be retrieved again.

The initial input screen has a field in which the user can enter the file descriptor of a document to be retrieved. Suppose, for example, that the user enters "B:industry" in this field, as shown, and presses the enter key. The file descriptor "B:industry" is sent from the client device I through the control module 2 to the linked document server 5 at site B. The linked document server 5 retrieves the requested source document "Industry" from the linked document store 8 and sends this source document back to the linked document translation system 11.

Proceeding through steps 301 to 309 in FIG. 4, the control module 2 ascertains that the source document is a text document, checks whether a translation of this document resides in the translation store 3, and has the document translated if necessary (if the document has not yet been translated, or has been updated since last translated). Since the submitted file descriptor did not include information designating a translation, the control module 2 sends the source document to the client device 1, adding a "Translation" button per step 310 in FIG. 4.

Figure 7:
FIG. 7 illustrates the display of a source document.

The user now sees the screen in FIG. 7, showing a Japanese text document with a "Translation" button. This button is tagged with the file descriptor "A:eng/B:industry" of the translated document. In this file descriptor "A" indicates that the document is stored in the translation store 3 at site A, "eng" indicates that it is an English translation, and "B:industry" indicates that it is a translation of the source document "industry" stored at site "B." This file descriptor is invisible to the user, who sees only the "Translation" button.

Let it here be assumed that this document has been retrieved in the past and has not been more recently updated, so that a valid English translation exists in the translation store 3. If the user operates the "Translation" button with the pointing device, the client device 1 sends the file descriptor "A:eng/B:industry" to the control module 2. The control module 2 strips off the "A:eng" and sends the "B:industry" onward to the linked document server 5, which again sends the Japanese text document "Industry" back to the control module 2.

As soon as the control module 2 receives the header of the document "Industry," it checks that the document has not been updated. By the above assumption, the document has not been updated, so the translation in the translation store 3 is still valid. Since the file descriptor received by the control module 2 included "A:eng," designating the English translation, the control module 2 gets the translated document from the translation store 3 and sends it back to the client device 1 (step 306 in FIG. 4). The user now sees the English translation shown in FIG. 8, without having to wait for the translation to be performed by the translation module 4.

Figure 8:
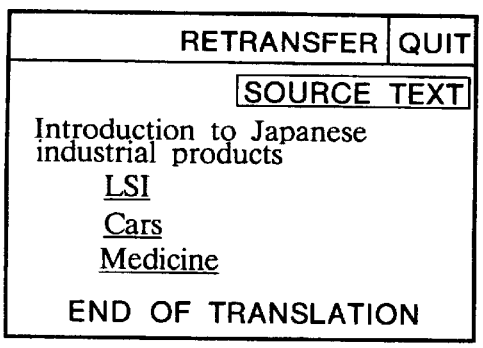
FIG. 8 illustrates the display of a translated document.

The "Source text" button in FIG. 8 is tagged with the file descriptor "B:industry." If the user operates this button, the client device 1 sends the file descriptor "B:industry" to the control module 2, and the source document is retrieved once again from the linked document store 8, just as it was retrieved when requested on the initial input screen. The display accordingly reverts to FIG. 7.

By pressing the "Translation" button in FIG. 7 and the "Source text" button in FIG. 8, the user can switch at will between the English and Japanese versions of the document, to check the accuracy of the translation, for example. Moreover, each time either button is operated, the control module 2 will have the linked document server 5 send the source document again, and will check whether the source document has been updated, so that the user always gets the latest version of the document, in either English or Japanese.

The industrial products listed in this document are tagged with the file descriptors of further linked documents. In the translated document in FIG. 8, "LSI" is tagged with the file descriptor "C:lsi," "Cars" with the file descriptor "D:car," and "Medicine" with the file descriptor "B:medicine." These tags were transferred from the source document when the source document was translated. The source document in FIG. 7 is identically tagged. The user does not see the tags (file descriptors) themselves, but can identify the tagged items by a form of highlighting such as underlining in the text.

If the user selects the tagged item "LSI" in either FIG. 7 or FIG. 8, the client device 1 sends the file descriptor "C:lsi" specified by the tag to tile control module 2, which passes it on to the linked document server 6 at site C and receives a Japanese text document named "LSI" that is stored in the linked document store 9. Suppose that this file has never been obtained by the control module 2 in the past.

Upon beginning to receive the document named "LSI," the control module 2 makes the checks described above and finds that this is a Japanese text document with no corresponding translated document stored in the translation store 3. The control module 2 immediately activates the translation module 4 (step 309 in FIG. 4) and has it start translating the document "LSI" into English. The translation process can begin even before the source document "LSI" has been completely received.

While the translation process is executing, the control module 2 sends the source document "LSI" to the client device 1 with a "Translation" button added. The user now sees the Japanese text display shown in FIG. 9. The "Translation" button is tagged with the file descriptor "A:eng/C:lsi," designating the file in the translation store 3 containing the English translation which the translation module 4 is now in the process of creating. Although this file is locked by the translation module 4 for write access, the lock does not prevent read access.

If the user operates the "Translation" button, the client device 1 sends the file descriptor "A:eng/C:lsi" to the control module 2. The control module 2 sends the file descriptor "C:lsi" on to the linked document server 6, receives the source document "LSI" again, and carries out the checks in steps 304 and 305 in FIG. 4. In step 304 it finds a corresponding file with descriptor "A:eng/C:lsi" in the translation store 3. Assuming that the source document has not been updated in the brief interval between the user's selection of "LSI" in FIG. 7 or 8 and his operation of the "Translation" button in FIG. 9, the control module 2 decides in step 305 that the translation is valid, and transmits the contents of the file "A:eng/C:lsi" to the client device 1.

Figure 9:
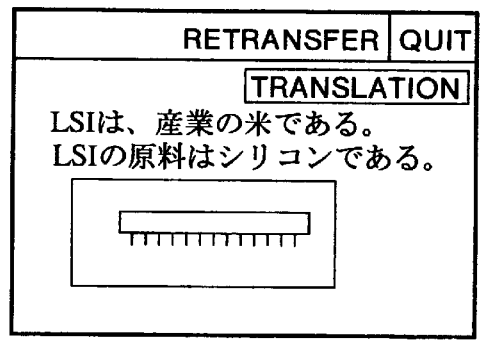
FIG. 9 illustrates the display of a further source document linked to the source document in FIG. 7.
Figure 10:
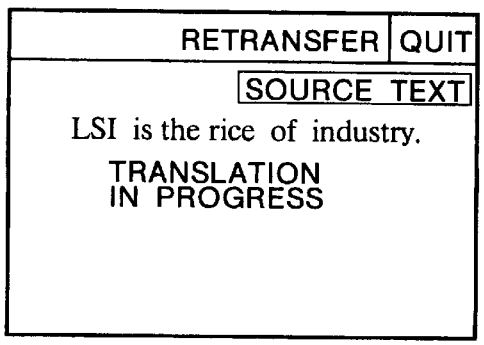
FIG. 10 illustrates the display of a translation-in-progress of the further source document.

The user now sees the screen in FIG. 10, showing the portion of the translation completed so far, together with a "Source text" button and a notice that the translation is currently in progress. The "Source text" button is tagged with the file descriptor "C:lsi." By operating the "Source text" button, the user can return to the Japanese text display in FIG. 9 as explained above.

Figure 11:
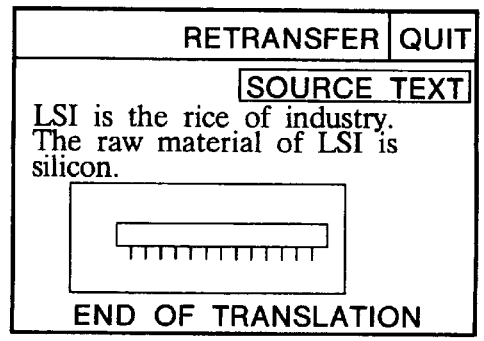
FIG. 11 illustrates the display of the completed translation.

If the user operates the "Retransfer" button in FIG. 10 (or the "Translation" button in FIG. 9) after the translation has been completed, he sees the screen in FIG. 11, showing the finished translation. In addition to English text, the translated document contains a picture of an LSI device which was transferred directly from the source document, an "End of translation" notice, and the same "Source text" button as in FIG. 10.

By operating the "Source text" button in FIG. 11, the user can return to the source document in FIG. 9. By operating the "Quit" button in FIG. 11, or on any of the other screens displayed, the user can disconnect from the document retrieval and display system.

While the "LSI" document is being translated by the translation module 4, the English version of this document may be requested by a second user at a different client device. The control module 2 will have the linked document server 6 send the source document again, and compare its header information with the header of the file "A:eng/C:lsi" in which the translation is currently being created. If the source document has not been updated, the control module 2 will send the second user the completed portion of the English translation from this file. The second user will accordingly be able to see a translation that was started even before he asked for the translated document.

If the source document has been updated, rendering the translation currently in progress invalid, the lock owned by the current translation process will be removed, the current translation will be deleted, and a new translation process will begin, using the newest version of the source document. Both the first and second users will accordingly get a translation of the latest updated version of the source document. In particular, the first user will get a translation of the updated version even though the update occurred after he requested the translation.

From the above description it can be seen that the first embodiment overcomes all of the problems pointed out in the prior art. First, the user does not have to access two separate systems or transfer documents between them; the necessary transfers are made automatically by the control module 2, which also activates the translation module. Second, the user can retrieve linked, and translated documents easily, just by operating buttons and selecting tagged items. Third, when a translation is required, the translation process starts, without delay, as soon as reception of the source document begins. Fourth, once a translation has been made, it becomes available to all users connected to the control module 2. As a result, time and computing resources are not wasted in translating the same document repeatedly. Fifth, since translated documents are kept consistent with their source documents, the user of the system never receives a translation that has gone out of date because the source document has been updated.

The large number of consistency checks performed in the first embodiment may indeed seem excessive, but the value of such numerous checks can be appreciated by considering a source document that is frequently updated, such as a source document containing a list of stock prices or other financial information.

A further advantage of the first embodiment is that it translates retrieved documents even before the translation is requested, so that when the translation is requested, the translated document can be furnished immediately. Suppose, for example, that the system is accessed by both Japanese-speaking and English-speaking users. When a Japanese-speaking user retrieves a Japanese source document, the system will create and store an English translation, even though the translation is not immediately needed. Then if an English-speaking user retrieves the same document later, he can get the translation quickly, without having to wait for execution of the translation process. The same applies when an English source document is retrieved first by an English-speaking user, then by a Japanese-speaking user. The system serves users of both languages equally.

A still further advantage of the first embodiment is that the client devices and linked document servers can be of a conventional design, and employ conventional retrieval procedures. The invention can accordingly be practiced simply by adding the novel linked document translation system 11 to an existing retrieval network, without having to modify either the client devices or the linked document servers.

Second embodiment

The second embodiment resembles the first, but displays all documents, as far as possible, in a fixed target language, regardless of the language of the source document. This embodiment is suitable for a system that serves users who all speak the same target language.

The configuration of the second embodiment is the same as the configuration of the first embodiment, as shown in FIG. 1, but the functions of the linked document translation system 11 differ. The translation module 4 of the second embodiment translates only into the fixed target language, from one or more other languages. If the target language is English, for example, the translation module 4 might be adapted to translate documents from Japanese into English, from Chinese into English, and from Russian to English. The translation store 3 stores only documents in the target language, e.g. English.

Figure 12:
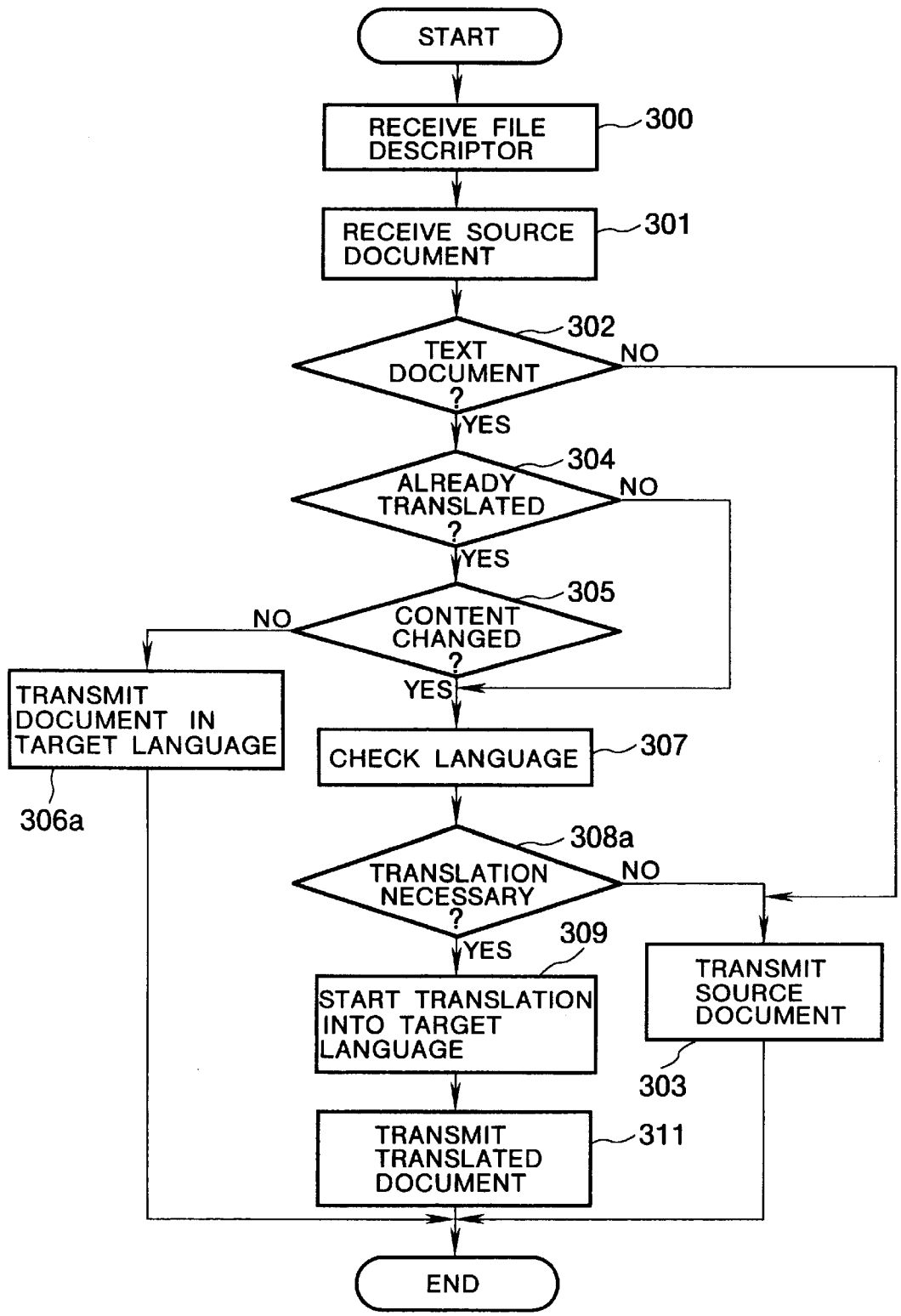
FIG. 12 is a flowchart illustrating a process executed by the control module in a second embodiment.

FIG. 12 illustrates the process executed by the (control module 2 of the second embodiment, using the same reference numerals as in FIG. 4 for identical or corresponding steps.

Steps 300 to 305 are the same as in the first embodiment, so a description will be omitted.

When the received source document contains text, has been translated before, and has not been modified since the last translation, so that a valid translated document is present in the translation store 3, the control module 2 transmits the translated document to the client device 1. Otherwise the source document is transmitted to the client device 1 (step 306a).

When the source document contains text but has not been translated before, or has been updated since the last translation, the control module 2 checks the language of the source document (step 307) and decides whether a translation is necessary (step 308a). A translation is deemed necessary if the source document is not in the fixed target language, but is in a language that the translation module 4 can translate into the fixed target language. If the source document is already in the fixed target language, or is in a language that the translation module 4 cannot translate into the fixed target language, translation is deemed unnecessary. The translation is also deemed unnecessary if the same document has been requested more recently by another user, as in the first embodiment.

If the translation is deemed unnecessary, the source document is transmitted to the client device 1 and displayed as in the first embodiment, but without a "Translation" button (step 303).

If the translation is necessary, the control module 2 activates the translation module 4 to have the document translated into the fixed target language (step 309), and transmits the translated document to the client device 1 (step 311). The translation process performed by the translation module 4 is the same as in the first embodiment, shown in FIG. 5, except that no "Source text" button is added in step 405. The translated document is sent to the client device 1 in real time, as it is being translated.

If the target language is English and the translatable languages are Japanese, Chinese, and Russian, then when a user of the second embodiment retrieves a Japanese, Chinese, or Russian document, he will see only the translated English version of the document, with no "Source text" or "Translation" buttons. If the document is being retrieved for the first time or has been updated since the last retrieval, the user will see a new translation as it is being created. If the document has been retrieved before and has not been updated since, the user will receive the old translated document immediately.

If the source document is in English, the user will see the source text with no "Translation" button. The user will similarly see the source text if it is in a language (e.g. Korean) that the translation module 4 cannot translate.

The second embodiment solves the same problems as the first embodiment. Although the second embodiment supports only a single target language, for speakers of this fixed target language, the second embodiment has three additional advantages. The first advantage is that the user is not unnecessarily confronted with text in a language he cannot read. The second advantage is that the translated document is provided completely automatically, without the user's having to operate a "Translation" button. The third advantage is that the translated document is provided more quickly, in that the system does not first retrieve and display the source document, then retrieve the source document a second time before displaying the translated document, as was done in the first embodiment.

Speakers of the target language can accordingly peruse documents in a natural manner in their own language, without being aware of the source language of the document. Only the "Translation in progress" or "End of translation" notice indicates that the document they are reading is a translation.

Third embodiment

The third embodiment is like the second, except that the user can specify the target language.

The third embodiment has the same configuration as the first and second embodiments, shown in FIG. 1. In the description below it will be assumed that the translation module 4 translates between English and Japanese in both directions, as in the first embodiment. The translation store 3 stores translated documents in both languages. The control module 2 executes the same process as in the second embodiment, shown in FIG. 12.

Figure 13:
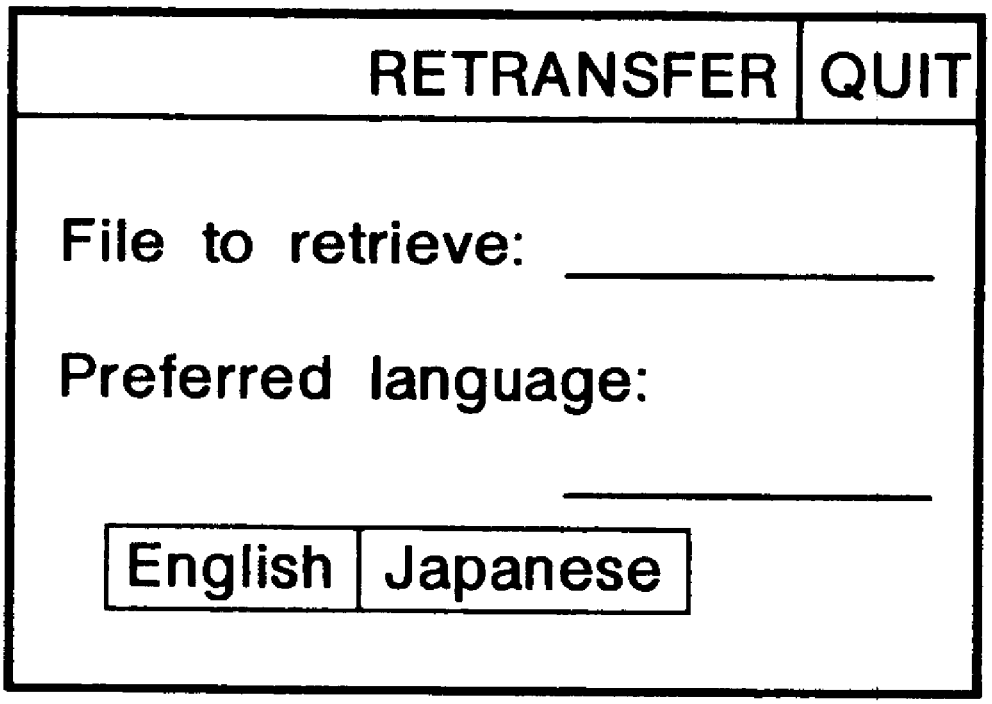
FIG. 13 illustrates an initial screen displayed in a third embodiment.

FIG. 13 shows the initial input screen displayed on the client device 1 in the third embodiment. In addition to a field for entering a file descriptor, the initial input screen now has a field for entering a preferred language. The preferred language is entered by, for example, selecting English or Japanese from a menu with a pointing device.

When the user selects a preferred language, the control module 2 sets the selected language as the target language for that particular client device 1 and proceeds as in the second embodiment, following the flowchart in FIG. 12. If the user selects English, he will see both English and Japanese source documents displayed in English, without "Source text" or "Translation" buttons. Similarly, if the user selects Japanese as the preferred language, he will see both English and Japanese source documents displayed in Japanese.

The control module 2 is preferably adapted to remember the selected target language even after the user operates the "Quit" button, and display this preferred target language as a default selection the next time the initial input screen is displayed on the same client device 1. Thus if the same user uses the client device 1 repeatedly, he does not have to select the target language each time. If a different user uses the client device 1, he can of course change the target language selection.

The third embodiment provides the same advantages as the second embodiment, with the additional advantage that. users can select their own preferred language. It is highly suitable for a system accessed by users with different native languages, when the quality of the translations provided by the translation module 4 is such that the users have no particular need to check translated documents against the source text.

Fourth embodiment

The fourth embodiment translates in various directions among more than two languages. In the description below these languages will be English, German, Japanese, and Russian.

Figure 14:
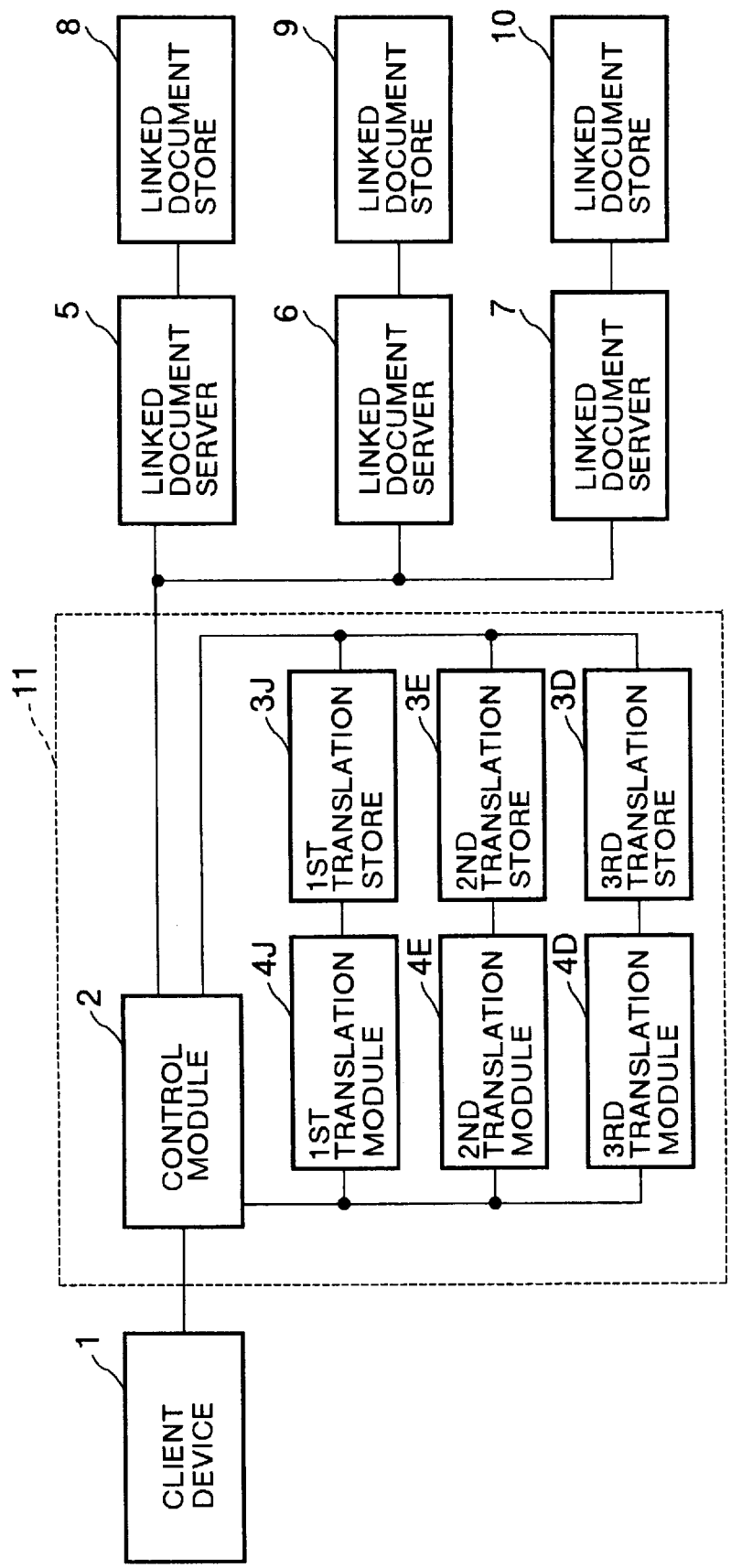
FIG. 14 is a block diagram of a fourth embodiment.

FIG. 14 shows the configuration of the fourth embodiment. The client device 1, linked document servers 5, 6, and 7, and linked document stores 8, 9, and 10 are the same as in the preceding embodiments. The linked document translation system 11 has a control module 2 generally similar to that in the preceding embodiments, but now has three translation stores 3J, 3E, and 3D and three translation modules 4J, 4F, and 4D.

The first translation store 3J stores Japanese text files, which have file descriptors with the prefix "A:jpn." The second translation store 3E stores English text files, which have file descriptors with the prefix "A:eng." The third translation store 31) stores German text files, which have file descriptors with the prefix "A:ger." The first translation module 4J is capable of translating English and Russian documents into Japanese. The second translation module 4E can translate Japanese documents into English. The third translation module 4D can translate Japanese documents into German. Corresponding pairs of translation modules and translation stores are interconnected, and all are connected to the control module 2, as shown.

The control module 2 executes the same process as in the first embodiment, shown in FIG. 4, but with slight differences in steps 306 to 310.

In selecting among the source and translated documents in step 306, the control module 2 selects among documents in two or more of the above-mentioned languages. If the control module 2 has received (in step 300) a file descriptor with the prefix "A:jpn," a Japanese translation is selected from the first translation store 3J. If the file descriptor had the prefix "A:eng," an English translation is selected from the second translation store 3E. If the file descriptor had the prefix "A:ger," a German translation is selected from the third translation store 31). If the file descriptor had none of these prefixes, the source document is selected.

In checking the language of the source document in step 307, the control module 2 checks whether the source document is in English, Russian, or Japanese, these being the three languages that can be translated. Translation is deemed necessary in step 308 if the source document; is in any one of these languages, unless a more recent request to retrieve the document has been received in the interim.

In starting the translation process in step 309, the control module 2 has the document translated into all possible languages. If the source document is in English or Russian, the control module 2 activates the first translation module 4J to have the document translated into Japanese. If the source document is in Japanese, the control module 2 activates both the second and third translation modules 4E and 4D, and has the document translated into both English and German.

When "Translation" buttons are added to the source document in step 310, each button also indicates a specific language. If the source document was in English or Russian, for example, a "Japanese translation" button is added, because the document is being translated into Japanese. If the source document was in Japanese, an "English translation" button and a "German translation" button are both added, giving the user a choice of translations.

The other steps in FIG. 4 are the same as in the first embodiment, so descriptions will be omitted. The translation modules 4J, 4E, and 4D all operate as in FIG. 5, each placing translated documents in the corresponding translation store 3J, 3E, or 3D.

The fourth embodiment combines the advantages of the first embodiment with the capability to translate among more languages. Embodiments of this type are particularly suitable for international networks.

Fifth embodiment

Figure 15:
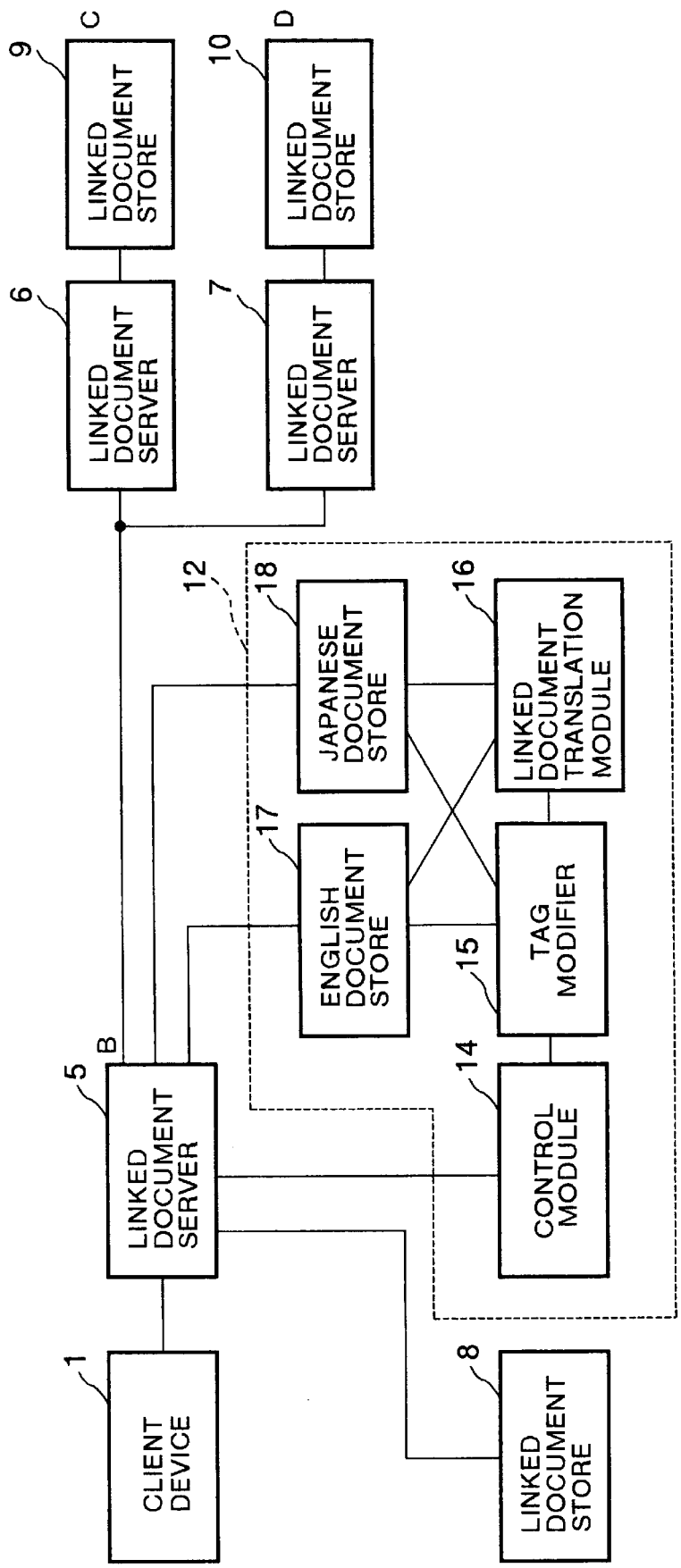
FIG. 15 is a block diagram of a fifth embodiment.

The fifth embodiment has the configuration shown in FIG. 15. The client device 1, linked document servers 5, 6, and 7, and linked document stores 8, 9, and 10 are generally similar to those shown in the preceding embodiments. The sites of the linked document servers 5, 6, and 7 and linked document stores 8, 9, and 10 will be denoted B, C, and D as before. To simplify the description of this embodiment, it will be assumed that all text documents stored at these sites are in either English or Japanese.

The client device 1 is connected to the linked document server 5 at site B, and accesses the other linked document servers 6 and 7 through this linked document; server 5. A document translation system 12 is also located at site B, and is connected to the linked document server 5. The client device 1, and other client devices (not shown) located at other points in the Communication network, gain access to the document translation system 12 through the linked document server 5.

The linked document translation system 12 comprises a control module 14, a tag modifier 15, a translation module 16, and two storage facilities comprising an English document store 17 and a Japanese document store 18.

The translation module 16 translates between English and Japanese in both directions. The tag modifier 15 modifies tags in the translated documents. The English document store 17 stores English text documents (linked documents) translated by the translation module 16 or retrieved by the linked document server 5. The Japanese document store 18 stores Japanese text documents (linked documents) translated by the translation module 16 or retrieved by the linked document server 5.

The control module 14 controls the operation of the entire linked document translation system 12. Although FIG. 15 is drawn as if the control module 14 is connected only to the tag modifier 15, the control module 14 is connected to all of the other elements 15 to 18 in the linked document translation system 12, and controls all of them.

Although not shown in the drawing, linked document translation systems may also be connected to one or more of the other linked document servers 6 and 7. Confusion does not arise, because each linked document translation system is addressed with a different site identifier (B, C, or D).

The client device 1 operates as in the preceding embodiments, following the flowchart shown in FIG. 2, except that it now has two different initial input screens. These screens will be referred to as the initial retrieve-and-translate screen and the initial retrieval-only screen.

Referring to FIG. 16, the initial retrieve-and-translate screen asks for the file descriptor of a document to be translated. This document may be stored at any of sites B, C, and D. The requested document will be retrieved, translated at site B, and displayed on the client device 1.

Referring to FIG. 17, the initial retrieval-only screen asks for the file descriptor of a document to be retrieved. The document will be retrieved and displayed, but not translated.

The user can switch between the two initial screens by, for example, entering a special command instead of a file descriptor. For example, to switch from the retrieval-only mode to the retrieve-and-translate mode, the user can enter a command such as "B:mt" on the initial retrieval-only screen in FIG. 17. This command designates the linked document translation system at site B. To switch from the retrieve-and-translate mode to the retrieve-only mode, the user can enter a different command, such as "B:start," on the initial screen in FIG. 16.

When a file descriptor is entered on the retrieval-only screen, the client device 1 sends the file descriptor entered by the user to the linked document server 5. When a file descriptor is entered on the retrieve-and-translate screen, however, a command prefix such as the one described above "B:mt" is attached to the file descriptor before it is sent to the linked document server 5.

Figure 18:
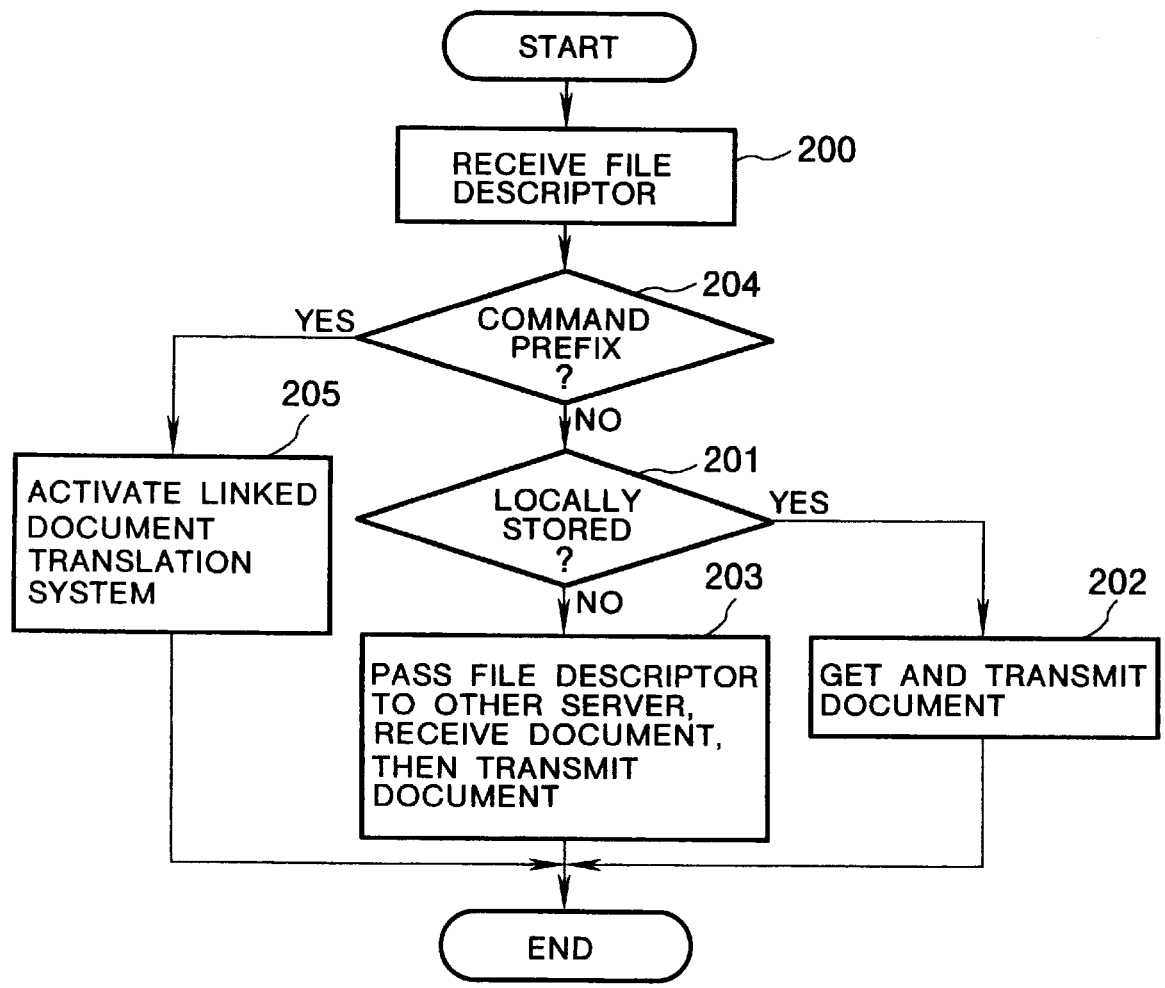
FIG. 18 is a flowchart illustrating a process executed by the linked document servers in the fifth embodiment.

The linked document server 5 operates according to the flowchart in FIG. 18. Steps 200 to 203 are the same as in FIG. 3.

After the file descriptor has been received in step 200, the linked document server 5 determines whether the file descriptor has the above-mentioned command prefix (step 204). If it does not, the linked document server 5 proceeds through steps 201, 202, and 203 as in the first embodiment. If the file descriptor has the above command prefix, the linked document server 5 activates the linked document translation system 12, more particularly the control module 14. The command prefix is stripped off the file descriptor, and the file descriptor itself is passed to the control. module 14 as a command parameter.

The other linked document servers 6 and 7 operate in a similar fashion if they also have linked document translation systems, or as in the first embodiment (without steps 204 and 205) if they do not.

Next, the operation of the linked document translation system 12 (in particular the control module 14) when activated by the linked document server 5 will be described.

Figure 19:
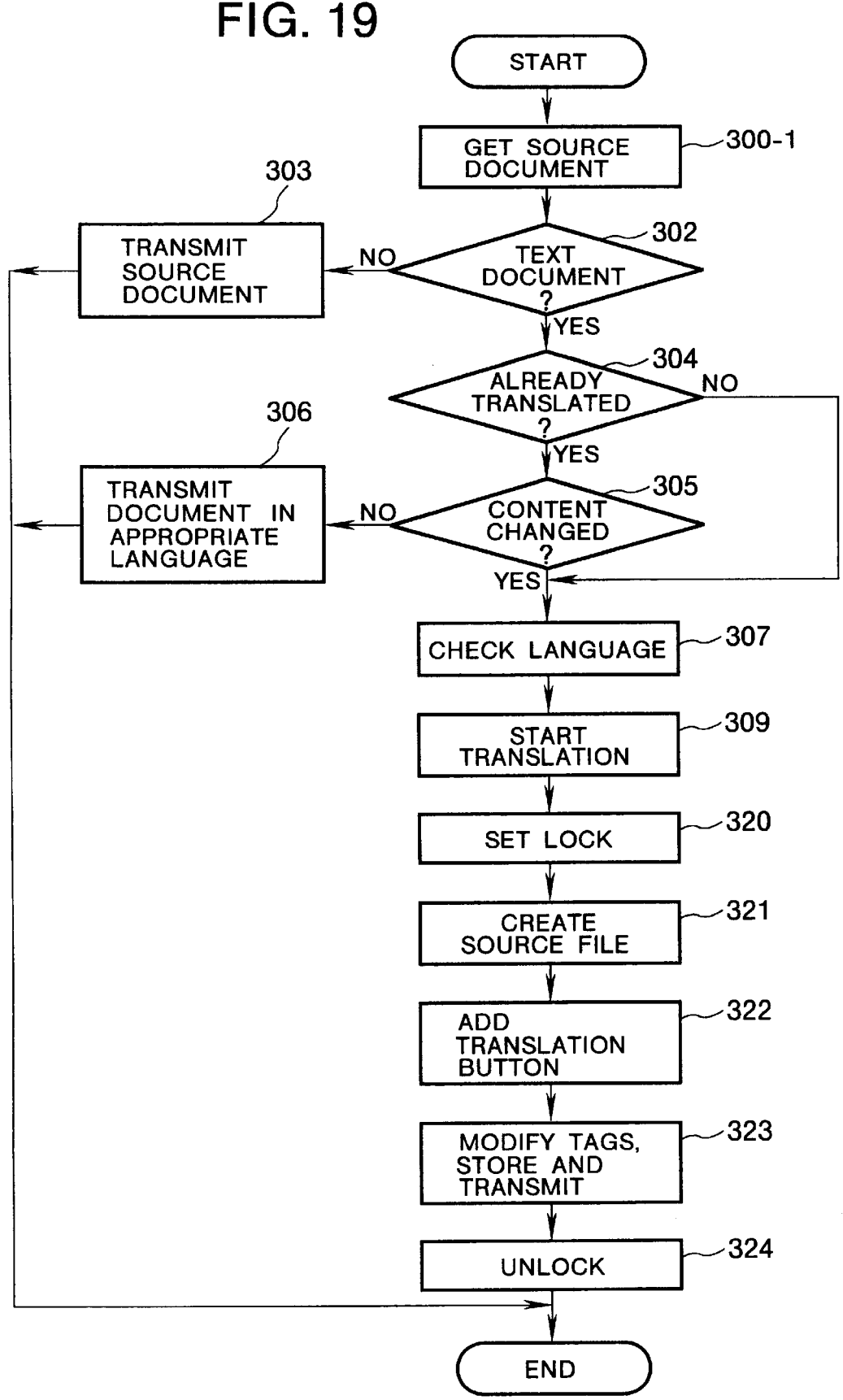
FIG. 19 is a flowchart illustrating a process executed by the control module in the fifth embodiment.

Referring to FIG. 19, in step 300-1, the control module 14 uses the file descriptor passed to it as a command parameter to obtain the requested source document. If the document is stored in the linked document store 8 at site B, the control module 14 has the linked document server 5 fetch it from this linked document store 8. If the document is stored in, for example, the linked document store 9 at site C, the control module 14 has the document transferred through the linked document servers 6 and 5. As the document is received, it is stored in a receive buffer (not explicitly shown in the drawings) in the linked document translation system 12.

Steps 302 to 305 are as described in the first embodiment. The control module 14 checks whether the source document is a text document, whether it has been translated before, and whether it has been updated since last translated. If the document is a text document and has been translated before, then the English and Japanese document stores 17 and 18 will contain both the source document and the translated document. If the source document has not been updated since the translated document was created, the control module 14 selects one of these two documents according to information in the file descriptor, and has the linked document server 5 transmit the selected document to the client device 1. As in the first embodiment, if the file descriptor specifies one language or the other, the document in the specified language is transmitted from the English or Japanese document store 17 or 18. Otherwise, the source document is transmitted from the English or Japanese document store 17 or 18.

The reason for transmitting the source document (when selected) from the English or Japanese document store 17 or 18, instead of from the above-mentioned receive buffer, is speed. When a long document is retrieved from a distant site, the transfer over the communication network may take considerable time. The document can be supplied to the client device 1 more quickly if it is obtained from the English or Japanese document store 17 or 18.

If the source document has not been translated before, or has been updated since last translated, the control module 14 proceeds to check the language of the source document in step 307, and activates the appropriate translation process in step 309. These steps are similar to the corresponding steps in the first embodiment. By assumption, all text documents are in English or Japanese, so there are no documents that cannot be translated.

In the remaining steps the source document is stored in a file in the English or Japanese document store 17 and 18, and transmitted to the client device 1. The file in which the source document is stored will be referred to as the source file.

First, a lock is set on the source file. The locking procedure described in detail with relation to the creation of translated documents in the first embodiment is followed again here: if a source file with the same file descriptor already exists, its contents are deleted, and if the file is locked, the existing lock is removed; then a new lock is set.

Next, the source file is created in the English or Japanese document store 17 or 18 by, for example, entering its file descriptor in a directory and allocating an initial amount of storage space (step 321). A "Translation" button is added to the source document (step 322). The tags in the source document are then modified, the source document is stored in the source file, and the source document is also transmitted to the client device 1 (step 323). The tag modification procedure will be described later.

After the source file has been stored, the source file is unlocked (step 324) and the control process terminates.

The translation process executed by the translation module 16 is generally similar to the process in the first embodiment, and follows the same flowchart in FIG. 5, so a detailed description will be omitted. One difference is that the tags are not transferred directly from the source document to the translated document, instead they are modified by the tag modifier 15 as described below. Also, if the translation is from Japanese to English, the translated document is placed in the English document store 17, whereas if the translation is from English to Japanese, the translated document is placed in the Japanese document store 18.

Figure 20:
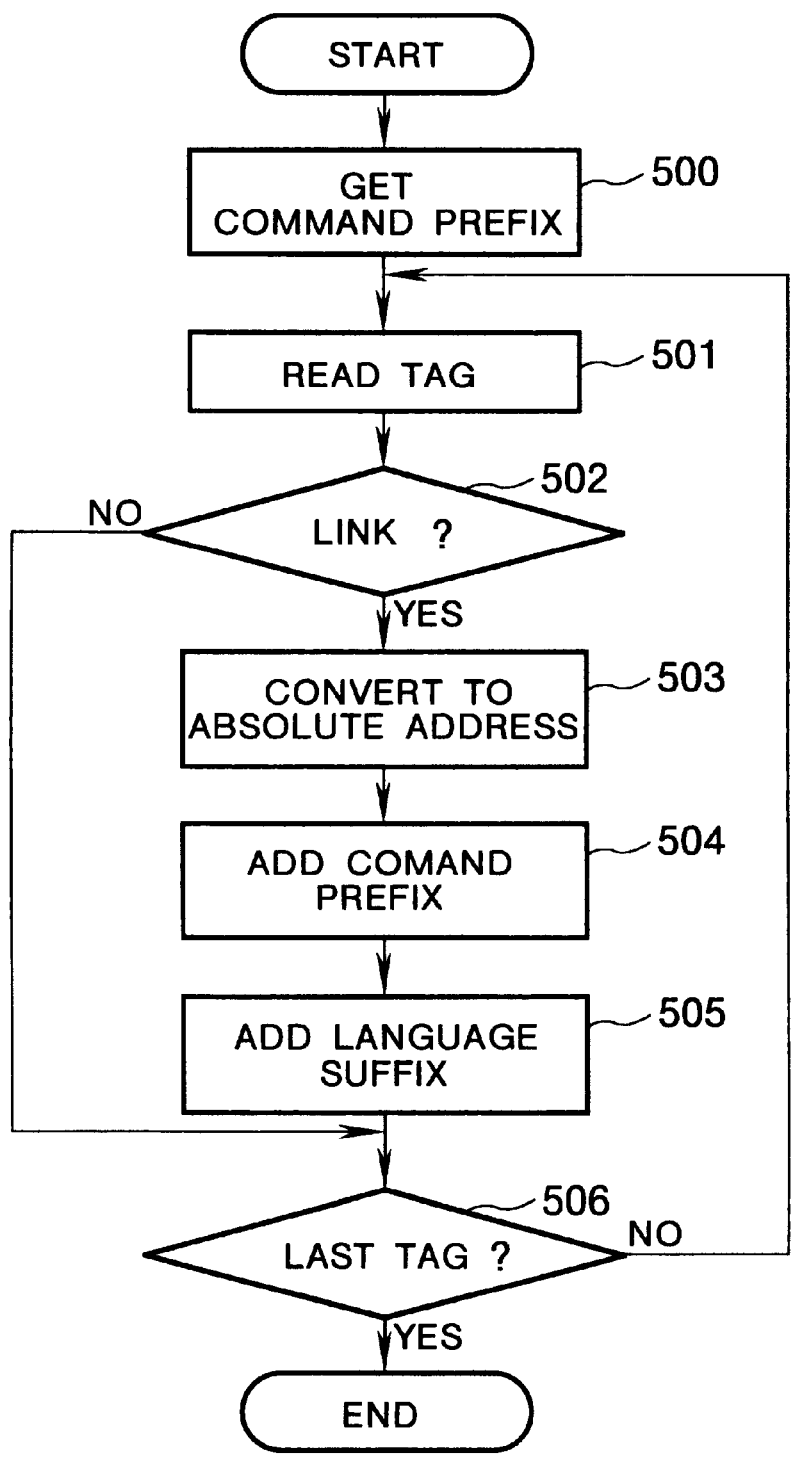
FIG. 20 is a flowchart illustrating a process executed by the tag modifier in the fifth embodiment.
Figure 21:
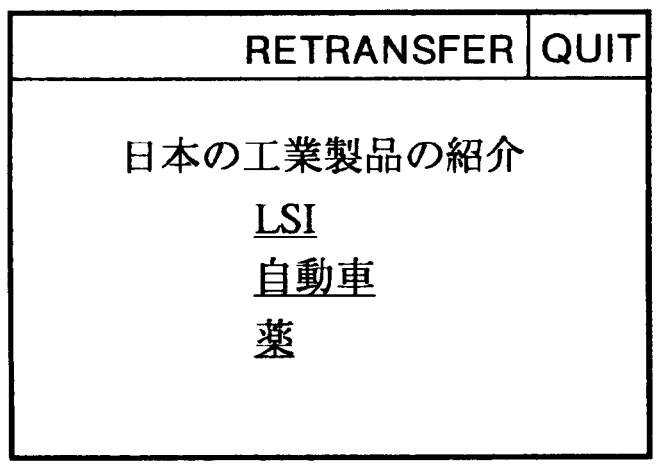
FIG. 21 illustrates a source document displayed by the fifth embodiment in a retrieval-only mode.
Figure 22:
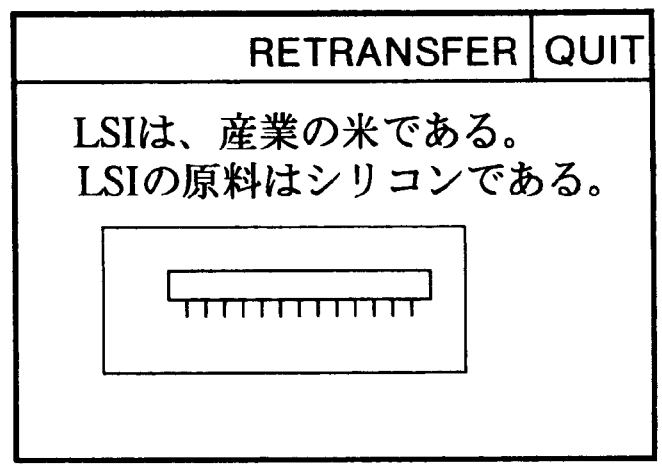
FIG. 22 illustrates a linked source document displayed by the fifth embodiment in a retrieval-only mode.

The tag modification process carried out by the tag modifier 15 will be described with reference to FIG. 20. As noted above, this process is executed for both the source document and the translated document when they are stored in the document stores 17 and 18.

First, the tag modifier 15 obtains, from the control module 14, the command prefix (for example, "B:mt") that activates the linked document translation system 12 (step 500). The tag modifier 15 then waits for tags to be passed to it from the control module 14 (if the source document is being processed) or from the translation module 16 (if the translated document is being processed).

Upon receiving a tag, the tag modifier 15 reads the tag (step 501) and determines whether it is a link to another document (step 502). If the tag is a formatting tag or other non-link tag, the tag modifier 15 passes the tag back to the control module 14 or translation module 16 without modification, and waits to receive the next tag.

If the tag is a link to another document, it may contain the file descriptor of that other document in a relative-address format. For example, since the documents "B:industry" and "B:medicine" are both stored at site B, the linking tag in the document "B:industry" may specify only the file name "medicine." The tag modifier 15 converts such relative file descriptors to an absolute-address format, e.g. from "medicine" to "B:medicine" (step 503).

Next, the tag modifier adds the command prefix obtained in step 500 (step 504) and a language suffix (step 505). The language suffix specifies the anticipated language of the source document, and the language in which the document is to be displayed. In the example above, the suffix of the tag inserted in the Japanese source document "B:industry" is ">JJ," indicating that the linked document is expected to be in Japanese, and that it should to displayed in Japanese. The suffix of the tag inserted in the English translated document is ">JE," indicating that the linked source document is expected to be in Japanese and that an English translation should be displayed.

The modified tag is then returned to the control module 14 or translation module 16 for insertion into the document. For the link from "B: industry" to "B:medicine," for example, if the original tag was simply "medicine," the control module 14 receives the modified tag "B:mt/B:medicine>JJ," and the translation module 16 receives "B:mt/B:medicine>JE."

The conversion of file descriptors from relative-address to absolute-address format is, incidentally, normally performed at the client device 1. The addition of a command prefix to the tag, however, may make it impossible for the client device 1 to convert the file descriptor correctly, so the conversion is performed by the tag modifier 15 instead.

Next, the operation of the fifth embodiment will be described with reference to the display screens shown in FIGS. 7 to 11, 16, 17, 21, and 22.

When the user accesses the document retrieval and display system, the client device 1 gets the initial retrieval-only screen shown in FIG. 17 from the linked document server 5, displays it, and waits for input. If the user wants to retrieve and translate documents, he enters a command such as "B:mt," designating the machine translation system at site B, to switch to the initial retrieve-and-translate screen shown in FIG. 16.

If the user wishes to retrieve and translate the description of Japanese industrial documents described in the first embodiment, he enters the file descriptor "B:industry" on this retrieve-and-translate screen and presses the enter key. The client device 1 automatically adds the command prefix "B:mt" and sends the file descriptor "B:mt/B:industry" to the linked document server 5, which activates the control module 14. The control module 14 then has the linked document server 5 transfer the file named "industry" from the linked document store 8 at site B into the receive buffer in the linked document translation system 12.

Suppose that the control module 14 has not obtained this document before, or that the document has been updated since last being obtained. As soon as the control module 14 receives the document header from the linked document store 8, it performs the checks in steps 302, 304, and 305 in FIG. 19. In step 304, to determine whether the document has been translated before, the control module 14 (which does not yet know the language of the source document) searches for a file descriptor of the form "B:eng/B:industry" or "B:jpn/B:industry" in the directories of the English and Japanese document stores 17 and 18. By the above assumption, either no such file descriptor is present, giving a "no" result in step 304, or the file is out of date, giving a "yes" result in step 305.

The control module 14 now proceeds to determine the language of the document being received. The document is in Japanese, so the English translation process is activated to have the document translated into English (steps 307 and 309 in FIG. 19).

While the translation process is proceeding, the control module 14 adds a "Translation" button to the source document, has its tags modified, and stores the source document in the Japanese document store 18, with the file descriptor "B:jpn/B:industry." The "Translation" button is tagged with the file descriptor "B:eng/B:industry" of the translation that the translation module 16 is creating in the English document store 17. The tags embedded in the source document "B:jpn/B:industry" are modified from "C:lsi," ""D:car," and "B:medicine" to "B:mt/C:lsi>JJ," "B:mt/D:car>JJ," and "B:mt/B:medicine>JJ," indicating that when retrieved, the linked documents are to be translated, but are to be displayed in Japanese. The tags embedded in the translated document "B:eng/B:industry" are changed to "B:mt/C:lsi>JE," "B:mt/D:car>JE," and "B:mt/B:medicine>JE," indicating that when the linked documents are retrieved, they are to be translated and displayed in English.

When the source document is written into the Japanese document store 18, it is also transmitted to the client device 1. The user now sees the screen shown in FIG. 7.

If the user operates the "Translation" button in FIG. 7, the client device 1 sends the associated file descriptor "B:eng/B:industry" to the linked document server 5, which gets the described document from the English document store 17 in the linked document translation system 12 and sends it back to the client device 1. Assuming that the translation has been completed, the user now sees the screen in FIG. 8.

In the fifth embodiment, the "Source text" button in FIG. 8 is tagged with the file descriptor "B:jpn/B:industry" of the source document stored in the Japanese document store 18. As in the first embodiment, the user can switch between the Japanese and English document versions in FIGS. 7 and 8 by operating the "Source text" and "Translation" buttons. Differing from the first embodiment, both documents are output from the English and Japanese document stores 17 and 18 in the linked document translation system 12 without having the source document retrieved from the linked document store 8 again.

If the user selects the tagged item "LSI" in FIG. 8, the client device 1 sends the associated tag "B:mt/C:lsi>JE" to the linked document server 5. Because of the command prefix "B:mt," the linked document server 5 activates the control module 14, which has the linked document servers 5 and 9 retrieve the document "LSI" from the linked document store 9 at site C.

Assuming that the control module 14 has not received the document "LSI" from site C before, or that this document has been updated since last received, the control module 14 follows the same procedure as described above to have the document translated. The suffix ">JE" assists the control module 14 in determining that the document is to be translated from Japanese into English, rather than the other way around, although the control module 14 preferably also checks the source document to confirm that it is a Japanese text document.

While the translation is proceeding, the user is first shown the source (Japanese) version of the "LSI" document, as in FIG. 9. If the user operates the "Translation" button, the associated tag "B:eng/C:lsi" is sent to the linked document server 5, which gets the translated document from the English document store 17 and sends it back.

The user then sees the screen shown in FIG. 10 or 11, depending on whether the translation is completed or riot. If the user operates the "Source text" button, the associated tag "B:jpn/C:lsi" is sent to the linked document server 5, which retrieves the source document from the Japanese document store 18.

If the user now operates the "Quit" button, the retrieval ends. Later a second user may want to repeat the process to retrieve and translate the same document "B:industry." If the source document has not been updated in the meantime, this second user will be able to get the existing translation from the English document store 17, without having to wait for the translation process to execute.

Furthermore, if this second user selects the tagged item "LSI" on the screen in FIG. 8, and if the source document "C:lsi" has not been updated in the meantime, in step 306 in FIG. 19 the control module 14 will recognize from the ">JE" suffix in the received tag "B:mt/C:lsi>JE" that the English translation is requested, and will select the English text document from the English document store 17 and send it to the client device 1. The user can accordingly proceed directly from the English translation of "B:industry" (FIG. 8) to the English translation of "C:lsi" (FIG. 11), without having to view the Japanese text of "C:lsi."

After the second user has used the system, it may be accessed by a third user who wishes only to retrieve and not to translate the linked document describing Japanese industrial products. When the screen in FIG. 17 is initially displayed, the third user simply enters the file descriptor "B:industry" without giving the command "B:mt." The client device 1 sends the file descriptor "B:industry" to the linked document server 5, which retrieves the requested Japanese text document from the linked document store 8 without activating the control module 14. The third user then sees the Japanese text screen shown in FIG. 21. No "Translation" button is displayed, and the tagged items have the unmodified tags "C:lsi," "D:car," and "B:medicine."

If the user selects "LSI" on this screen, the associated tag "C:lsi" is sent to the linked document server 5 and passed to the linked document server 9, which sends back the requested Japanese text document. The user now sees the screen shown in FIG. 22, which again has no "Translation" button. In short, for the third user, the system operates like a conventional linked document retrieval and display system.

The fifth embodiment provides essentially the same advantages as the first embodiment, but gives the user more control over system operations, in that the user can select whether or not to activate the linked document translation system 12.

A further advantage of the fifth embodiment is that, since the linked document translation system 12 stores both source and translated versions of retrieved documents, when the user retrieves a document that has not been updated since being last retrieved, the system can quickly supply the user with both the source document and its translation, without having to wait for a completion of the transfer of the source document from a distant linked document store.

A still further advantage is that when a user retrieves a linked series of documents in a foreign language, if the documents have been retrieved and translated before, and if currently valid translations are stored in the storage facilities of the linked document translation system 12, the user has to select the translated version of only the first document in the series. Further linked documents are displayed automatically in their translated form.

When a user switches back and forth between a source document and the corresponding translated document by operating the "Source text" and "Translation" buttons, the system does not retrieve the source document from the linked document store 8, 9, or 10, but supplies both the source and translated documents from the English and Japanese document stores 17 and 18. This saves time, and ensures that the source and translated documents the user sees are consistent with each other.

The fifth embodiment can be implemented by adding the linked document translation system 12 to an existing linked document server 5 and making the linked document server 5 aware of the existence of the newly added system 12, so that it will activate the control module 14 in response to a command like "B:mt," and will display the initial retrieve-and-translate screen. No other changes to the existing system are required, and the user needs to learn only one new command (B:mt).

The linked document servers 6 and 7 at sites C and D can also be made aware of the existence of the linked document translation system at site B, so that users who access the network through sites C and D can also obtain translation services at site B.

Sixth embodiment

The sixth embodiment combines features of the second and fifth embodiments, displaying retrieved documents in a fixed target language. For simplicity, all documents in the sixth embodiment will be in either English or Japanese. The target language is one of these two languages.

Figure 23:
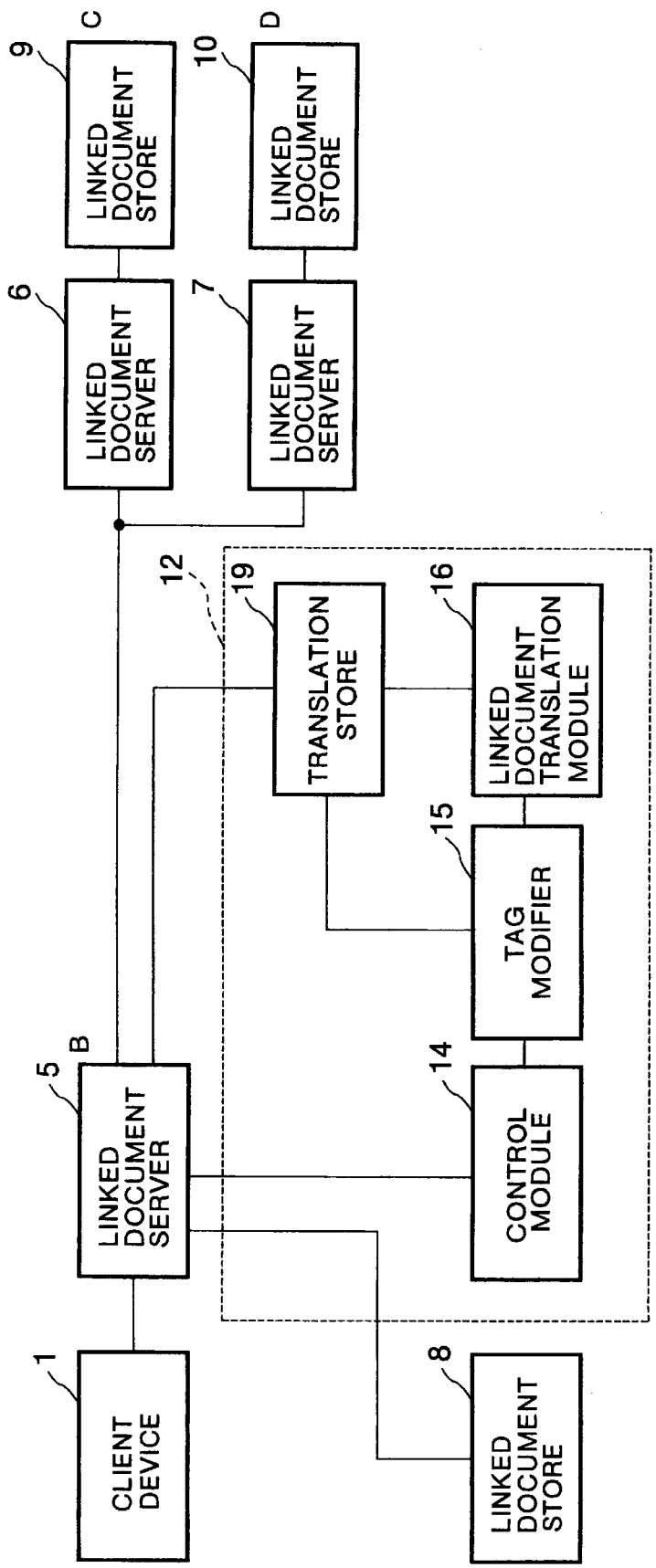
FIG. 23 is a block diagram of a sixth embodiment.

Referring to FIG. 23, the sixth embodiment has the same client device 1, linked document servers 5, 6, and 7, and linked document stores 8, 9, and 10 as the fifth embodiment, and a generally similar linked document translation system 12 with a control module 14, tag modifier 15, and translation module 16. The tag modifier 15 is identical to that in the fifth embodiment, but the control module 14 and translation module 16 operate somewhat differently. The translation module 16 translates only into the fixed target language. As its storage facility, the linked document translation system 12 has a single translation store 19, instead of separate English and Japanese document stores.

Figure 24:
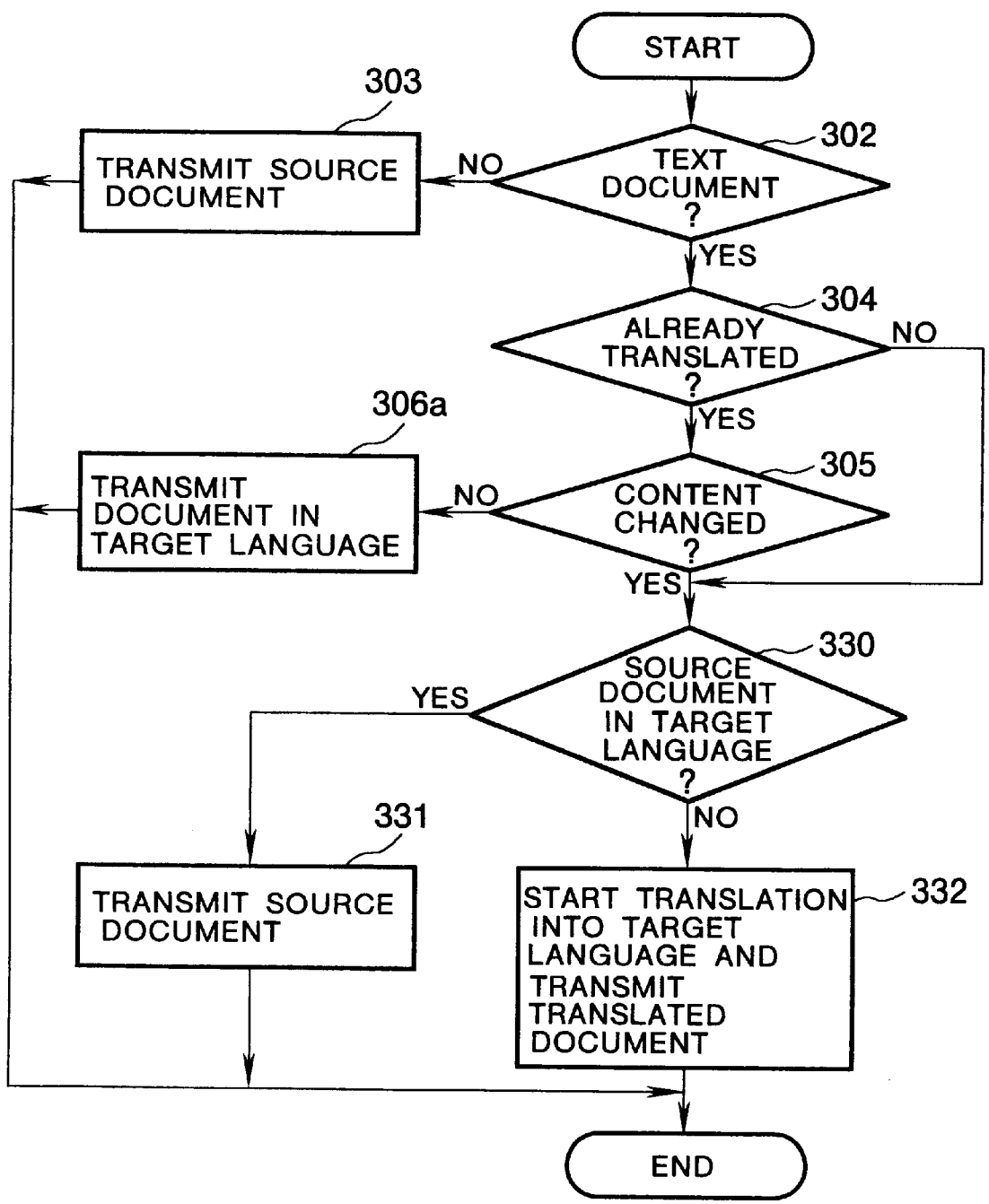
FIG. 24 is a flowchart illustrating a process executed by the control module in the sixth embodiment.

The operation of the control module 14 in the sixth embodiment will be described with reference to the flowchart in FIG. 24. The process in FIG. 24 starts from the point at which a source document has been retrieved by the linked document server 5 from one of the linked document stores 8, 9, or 10.

Steps 302, 303, 304, 305, and 306a are identical to the corresponding steps in the second embodiment, shown in FIG. 12, so a detailed description will be omitted. If the source document is not a text document, it is sent directly to the client device 1. If it is a text document, has been translated before, and has not been updated, then the corresponding translated document in the target language is taken from the translation store 19 and is sent to the client device 1.

If the source document is a text document that has not been translated before, or has been updated since last translated, the control module 14 next determines whether the source document is in the target language (step 330) If the source document is in the target language, the control module 14 has the source document sent, without modification, to the display and input means 1 (step 331). Otherwise, the control module 14 has the source document translated into the target language and the translated document stored in the translation store 19 by the translation module 16, and has the linked document server 5 transmit the translated document from the translation store 19 to the client device 1 (step 332).

As in the fifth embodiment, the user can switch between the initial retrieve-and-translate screen in FIG. 16 and the initial retrieval-only screen in FIG. 17. If the user selects the initial retrieve-and-translate screen in FIG. 16, then the document control module 14 is activated for all document retrievals, and all documents are displayed in the target language, without "Source text" and "Translation" buttons. When a series of linked source documents are retrieved, the client device 1 now adds the command prefix "B:mt" automatically to all of the file descriptors entered on the initial retrieve-and-translate screen or output by selecting tagged items in the documents.

To the user, the sixth embodiment appears to operate like the second embodiment, except that the user now has the option of starting from the retrieval-only screen in FIG. 17 and retrieving all documents in their source language.

Seventh embodiment

The seventh embodiment combines the features of the third and fifth embodiments, allowing the user to specify the target language.

The seventh embodiment has the same equipment configuration as the fifth embodiment, with separate English and Japanese document stores 17 and 18, but the processing of the control module 14 differs from the fifth embodiment. Also, the initial retrieve-and-translate screen is now the screen shown in FIG. 13, on which the user can both enter the file descriptor of a document to be retrieved and select a preferred language.

Figure 25:
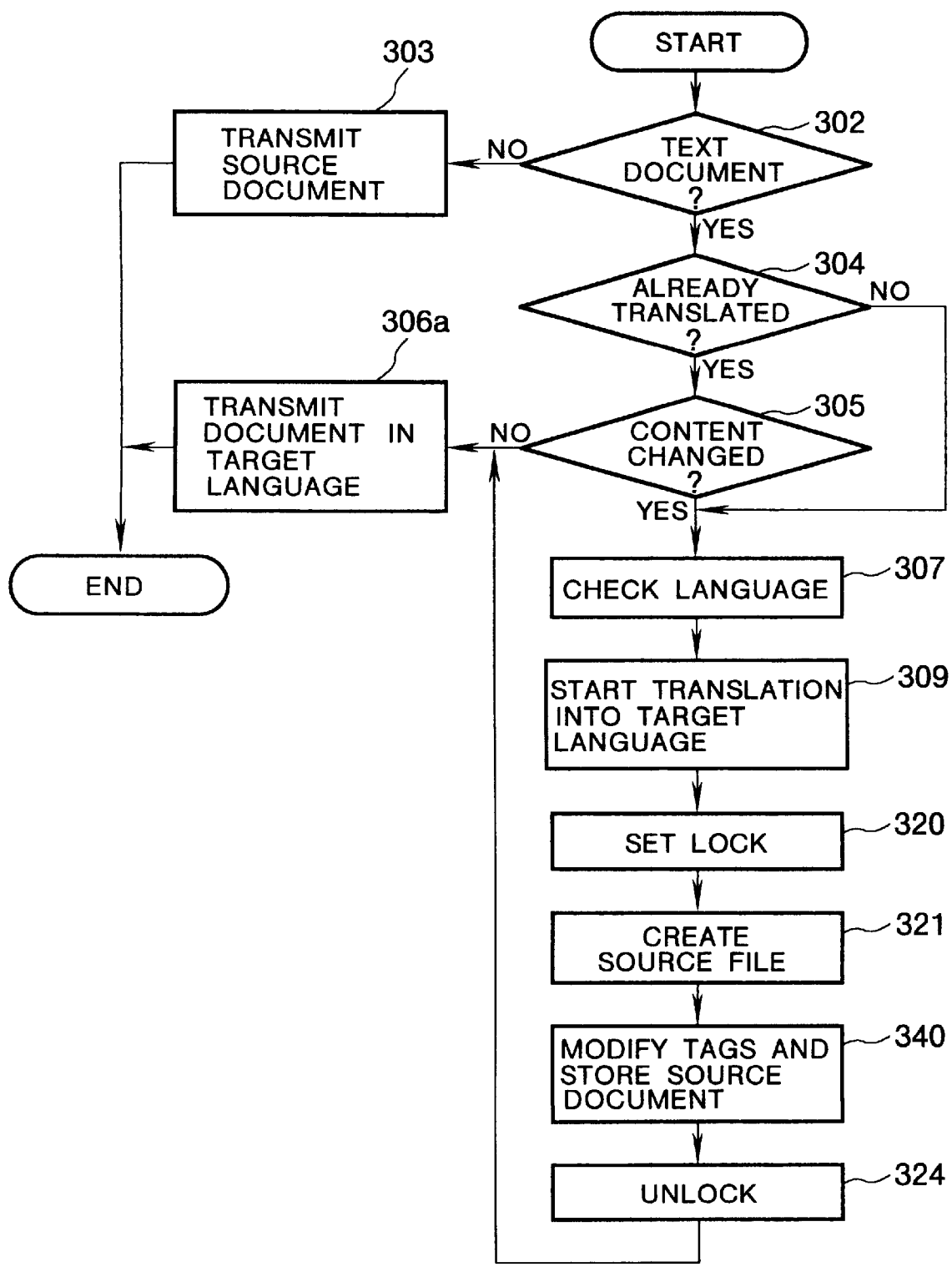
FIG. 25 is a flowchart illustrating a process executed by the control module in a seventh embodiment.

FIG. 25 shows the process executed by the control module 14. Steps 302, 303, 304, 305, and 306a are identical to the corresponding steps in the third and sixth embodiments, shown in FIGS. 12 and 24. Steps 307, 309, 320, 321, and 324 are identical to the corresponding steps in the fifth embodiment, shown in FIG. 19. Descriptions of these steps will be omitted.

In step 340, the control module 14 has the tag modifier 15 modify the tags in the source document as described earlier, and stores the source document in the source file created in the preceding step 321, but does not necessarily have the source document transmitted to the client device 1. Instead, the process proceeds through step 324 to step 306a, and either the source document or the translated document, whichever is in the target language, is transmitted to the client device 1.

The user of the seventh embodiment can choose between the initial screen in FIG. 17, to have all retrieved documents displayed in their original language, and the initial screen in FIG. 13, to have all retrieved documents displayed in a selectable target language. No "Source text" or "Translation" buttons are displayed, but when the initial screen in FIG. 13 is selected, the linked document translation system 12 translates all retrieved documents, and stores both the source and translated versions. Thus if the same document is requested again later, possibly by a different user, the system is ready to provide the document immediately, in either language.

Eighth embodiment

Figure 26:
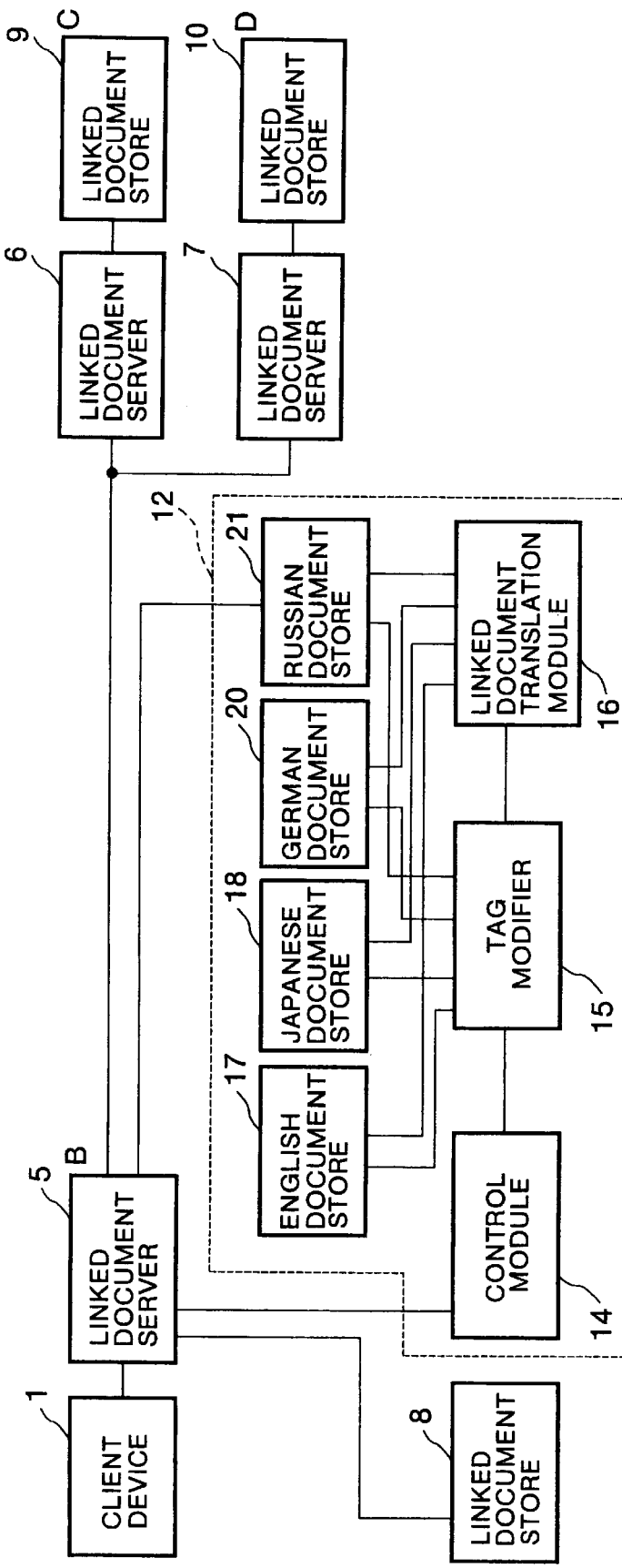
FIG. 26 is a block diagram of an eighth embodiment.

The eighth embodiment combines features of the fourth and fifth embodiments. The equipment configuration, shown in FIG. 26, is the same as in the fifth embodiment, except that the storage facilities of the linked document translation system 12 include not only English and Japanese document stores 17 and 18 but also German and Russian document stores 20 and 21. The documents stored in the linked document stores 8, 9, and 10 are in English, Japanese, and Russian.

The translation module 16 of the eighth embodiment combines the capabilities of the three translation modules of the fourth embodiment. It is accordingly capable of translating from English to Japanese, from Russian to Japanese, from Japanese to English, and from Japanese to German.

The process executed by the control module 14 of the eighth embodiment is similar to that in the fifth embodiment, shown in FIG. 19, with the same modifications as in the fourth embodiment to deal with multiple languages. When a document is translated, it is translated into all possible languages. A Japanese source document, for example, is translated into both English and German. In this case the translation module 16 concurrently executes two versions of the translation process shown in FIG. 5 (i.e. one for each language).

When a source document is translated, both the source document and the translated document or documents are stored in the appropriate document stores 17, 18, 20, and 21.

In step 306 in the eighth embodiment, the control module 14 checks whether a display of the document in English, German, Japanese, or Russian is requested, and transmits the document in the appropriate language from the corresponding document store 17, 18, 20, or 21.

As in the fourth embodiment, the "Translation" button also specifies the language, and multiple "Translation" buttons for different languages may be output on the same source document.

As in the fifth embodiment, the user can select either an initial retrieve-and-translate screen or a retrieval-only screen.

Further detailed description of this embodiment will be omitted, as its operation can be understood from the description of the preceding embodiments. The advantages provided are those of the fifth embodiment, with the additional advantage of translating among more than two languages.

Ninth embodiment

In the ninth embodiment, the linked document translation system is located at the user's site. The ninth embodiment translates between only two languages, e.g. English and Japanese.

Figure 27:
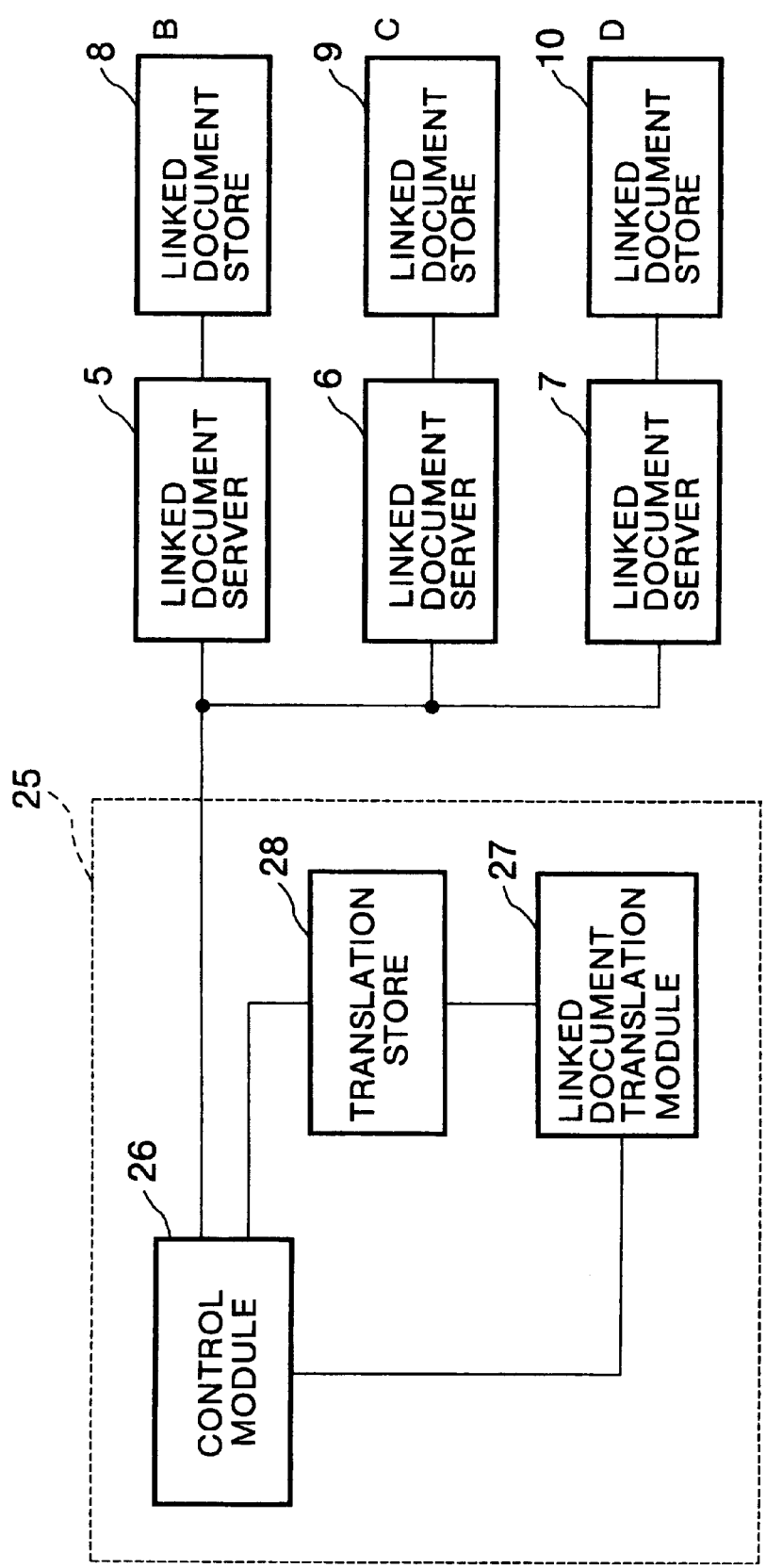
FIG. 27 is a block diagram of a ninth embodiment.

FIG. 27 shows the equipment configuration of the ninth embodiment. The linked document servers 5, 6, and 7 and linked document stores 8, 9, and 10 are the same as in the first embodiment.

The client device 25 now comprises a control module 26, a linked document translation module 27, and a translation store 28. The client device 25 is, for example, a personal computer with a multi-tasking operating system capable of executing different processes concurrently. The control module 26 executes as a foreground process, with which the user interacts directly. The linked document translation module 27 executes as a background process, with which the user does not directly interact. The translation store 28 comprises, for example, a magnetic or optical disk, or a portion thereof, which can be accessed by both the control module 26 and linked document translation module 27. The translation store 28 may be one part of the general-purpose storage facilities possessed by the client device 25.

The client device 25 also comprises a buffer memory and other well-known facilities, which are not shown in the drawings.

The control module 26 in the ninth embodiment combines functions of the client devices and control modules of the preceding embodiments. The operation of this control module 26 will be described with reference to the flowchart in FIGS. 28A and 28B.

Figure 28A:
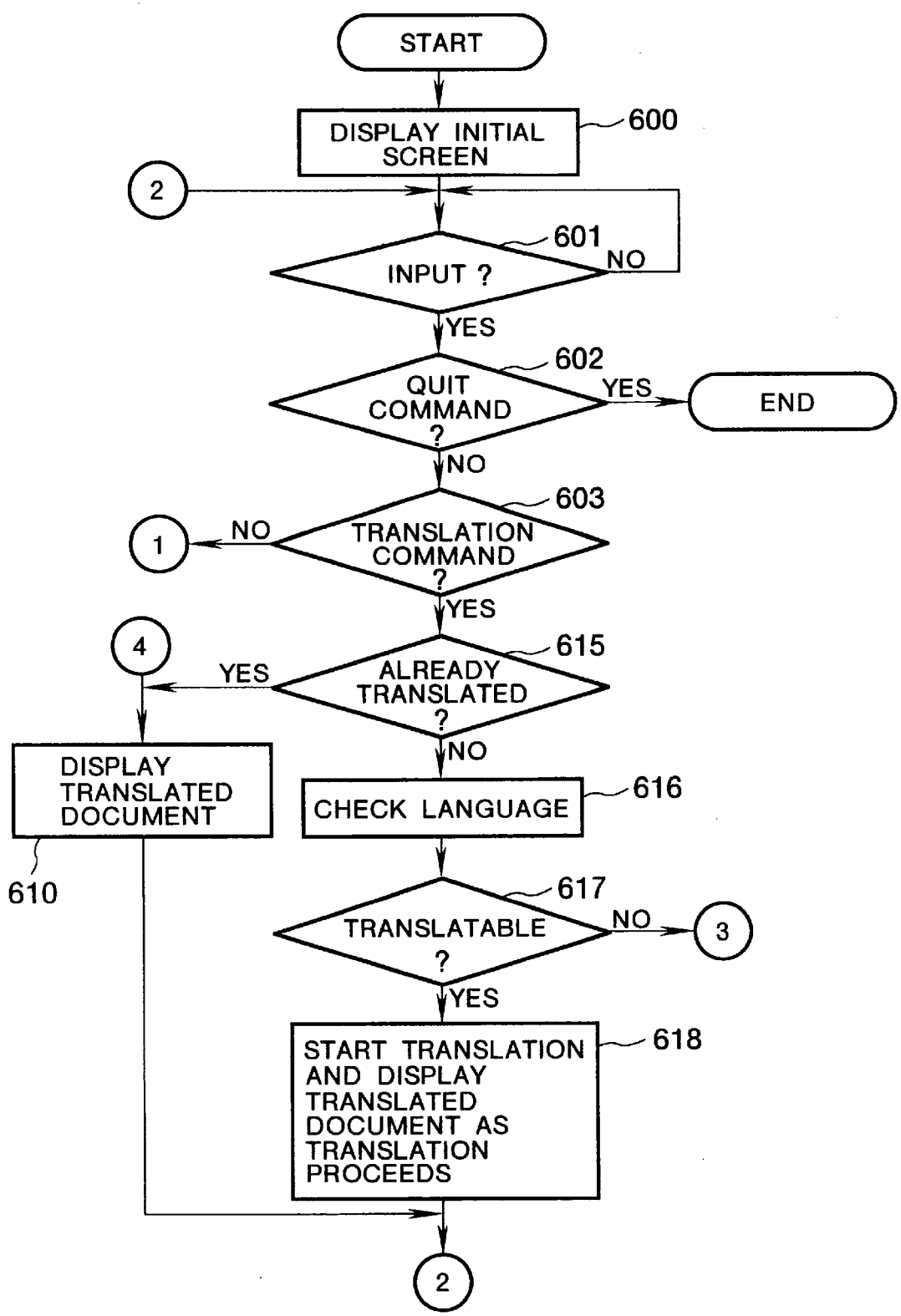
FIG. 28A and FIG. 28B are two parts of a flowchart illustrating a process executed by the control module in the ninth embodiment.

Referring to FIG. 28A, when first activated, the control module 26 displays an initial input screen (step 600) and waits for input from the user (step 601).

FIG. 29 shows the initial input screen. Displayed at the top of this screen are a "Translation" button, a "Retransfer" button, and a "Quit" button. These buttons appear at the top of all screens displayed by the control module 26, except that when a translated document is displayed, the "Translation" button is replaced by a "Source text" button. The "Translation" and "Source text" buttons are tagged with commands that will be described below.

Referring again to FIG. 28A, input may take the form of a file descriptor, or a command produced by operation of a button. When input occurs, the control module 26 first decides whether the input is a "Quit" command due to operation of the "Quit" button (step 602). If the input was the "Quit" command, the control module 26 terminates operation.

If the "Quit" command was not given, the control module 26 next decides whether a "Translation" command was given by operation of the "Translation" button (step 603). If the "Translation" button was not operated, a further decision is made as to whether or not a "Source text" command was given by operation of the "Source text" button (step 604 in FIG. 28B).

If none of these buttons have been operated, the input is a file descriptor. The control module 26 sends the file descriptor to the appropriate linked document server 5, 6, or 7 and receives in return a source document (step 605). The source document is temporarily stored in a buffer at the client device 25.

The control module 26 decides whether the received source document is a text document (step 606), whether it has been translated before (step 607), and if so, whether it has been updated since being last translated (step 608). The checks in steps 607 and 608 are made by searching for a file with the same file descriptor in the translation store 28 and comparing the document header of that file, if found, with the document header of the received source document.

If the source document is not a text document, or has not been translated before, the control module 26 displays the source document (step 609). The display can begin even before the source document has been completely received.

If the source document is a text document that has been translated before and has not been updated since last being translated, the control module 26 gets the translated document from the translation store 28 and displays the translated document (step 610 in FIG. 28A). Following either step 609 or step 610, the control module 26 returns to step 601 and awaits further input.

If the source document is a text document that has been translated before and has been updated since last being translated, the control module 26 concludes that a new translation is necessary, checks the language of the source document (step 611 in FIG. 28B), and decides whether the language is translatable (step 612). Since the document has been translated before, it will normally be in one of the two languages that the linked document translation module 27 can translate. In this case the control module 26 starts the translation process to have the document translated into the other of those two languages (step 613). Tn the unusual case in which the language of the source document was changed when the document was updated, making the document no longer translatable, the control module 26 skips the translation process. In either case, the control module 26 proceeds to display the source document in its original language (step 609).

Figure 28B:
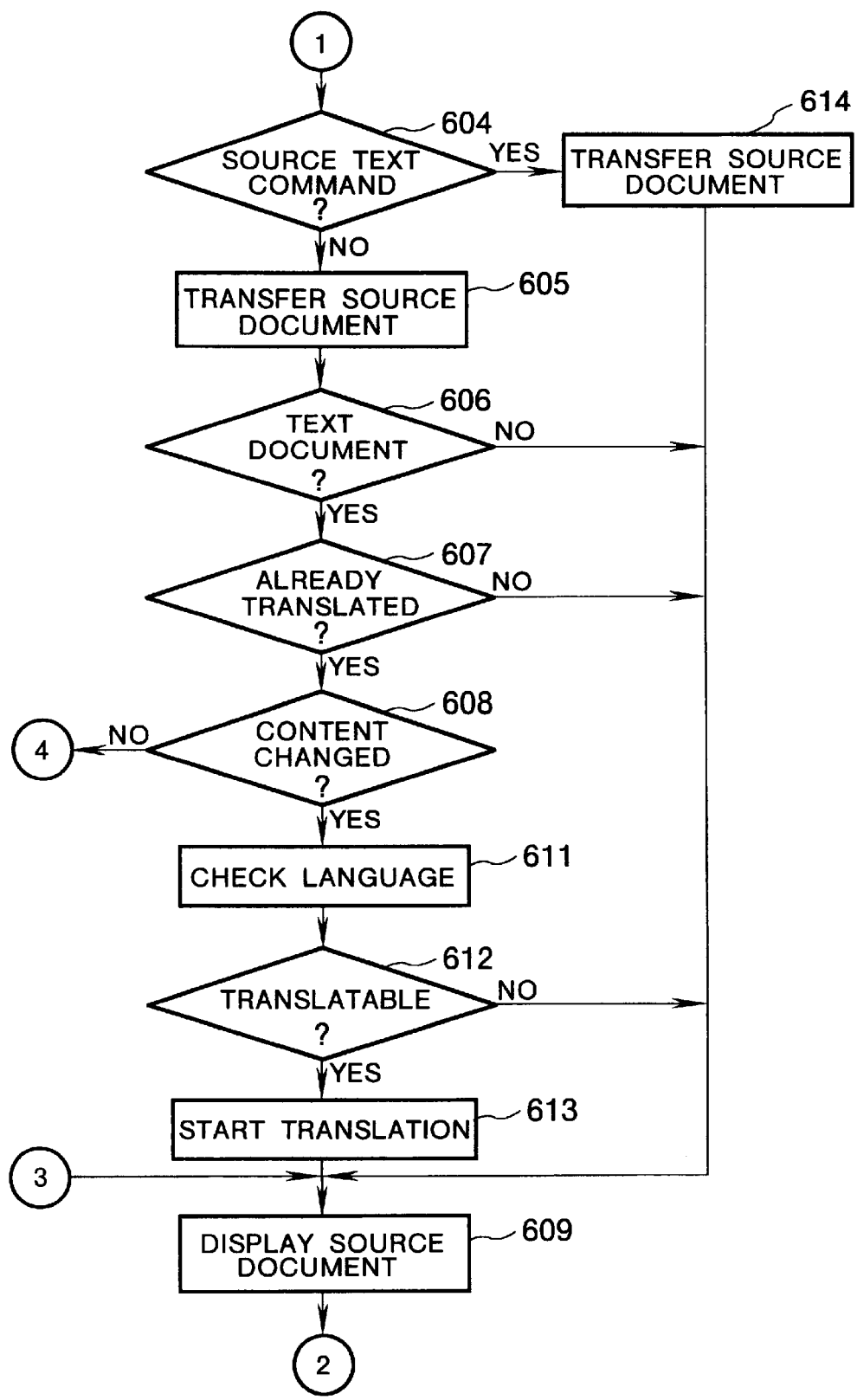

If the "Source text" button was operated, giving a "yes" result in step 604 in FIG. 28B, the control module 26 sends the file descriptor of the document currently on display (which is a translated document) to the appropriate linked document server 5, 6, or 7, receives the source document in return (step 618), and displays the source document (step 609), then awaits further input (step 601 in FIG. 28A).

If the "Translation" button was operated, giving a "yes" result in step 603 in FIG. 28A, the control module 26 searches in the translation store 28 for a file descriptor matching the file descriptor of the document currently on display, to see if the document on display has already been translated (step 615 in FIG. 28A). If it has already been translated, the translated document in the translation store 28 is displayed (step 610).

If the document on display (the source document) has not already been translated, the control module 26 checks the language of the document (step 616) and decides whether it can be translated (step 617). If the language can be translated, the control module 26 starts the translation process and displays the translated document as the translation proceeds (step 618). If the language cannot be translated, the control module 26 continues displaying the source document (step 609 in FIG. 28B). After either step 618 or step 609, the control module 26 awaits a further input (step 601).

The translation process started in step 613 or step 618 is executed by the translation module 27. This process is generally similar to the process described in the first embodiment, and follows the flowchart in FIG. 5. In step 400, however, the file descriptor of the translated document is the same as the file descriptor of the source document. The lock check in step 401 will normally pass, unless the translated document file is being modified by some other process running on the user's computing system, in which case the translation module 27 removes the previous lock and deletes the file contents, as described in the first embodiment (step 402). In step 405 the "Source text" button is not output in the translated document; instead, a "Source text" button is displayed at the top of the screen by the control module 26 whenever a document stored in the translation store 28 is displayed. The other steps in FIG. 5 are as described in the first embodiment.

Next, the operation of the ninth embodiment will he described with reference to the screens in FIGS. 29 to 34.

Suppose that on the initial input screen in FIG. 29, the user enters the file descriptor "B: industry" to retrieve the description of Japanese industrial products stored at site B. Suppose also that this document has not been translated before by the client device 25. Proceeding through steps 600 to 607 and 609 in FIGS. 28A and 28B, the control module 26 retrieves and displays the Japanese text source document as shown in FIG. 30. The file descriptors associated with the tagged items in FIG. 30 are "C:lsi," "D:car," and "B:medicine."

If the "Translation" button is operated on the screen in FIG. 30, the control module 26 proceeds through steps 601 to 603 and 615 to 618 in FIG. 28A and begins displaying the English translation of this document. The user can see the translation proceeding on the screen.

When the translation is completed, the screen in FIG. 31 is displayed. The file descriptors associated with the tagged items are "C:lsi," "D:car," and "B:medicine."

If user operates the "Source text" button in FIG. 31, the control module 26 proceeds through steps 601 to 604, step 614, and step 609 in FIGS. 28A and 28B, retrieves the Japanese text source document from site B again, and places it on display, returning to the screen in FIG. 30.

If the "Translation" button is operated again, the control module 26 proceeds through steps 601 to 603 in FIG. 28A, now finds in step 615 that the document has already been translated, and immediately displays the translated document stored in the translation store 28, without transferring the source document a second time. The screen returns to FIG. 31.

If the user selects "LSI" with his pointing device on the screen in either FIG. 30 or 31, the control module 26 receives the file descriptor "C:lsi," proceeds through steps 601 to 605 in FIGS. 28A and 28B, and retrieves the document named "LSI" from site C. If this document has not been translated before, the control module 26 displays the Japanese text source document as shown in FIG. 32.

If the user operates the "Translation" button in FIG. 32, the control module 26 follows the steps described above to begin translating the "LSI" document into English. As the translation proceeds, the user sees first the screen in FIG. 33, then the screen in FIG. 34. By operating the "Source text" button, the user can return to the screen in FIG. 32.

If the user presses the "Quit" button in FIG. 34, the English translations of the documents "B:industry" and "C:lsi" remain in the translation store 28. The next time the user retrieves these two linked documents, assuming they have not been updated, the control module 26 will proceed through steps 600 to 608 in FIGS. 27A and 27B to step 610 in FIG. 27A and display the translated documents directly from the translation store 28, without displaying any Japanese text. If the user wants to see the Japanese text, he can operate the "Source text" button in FIG. 30 or 33.

If the source documents have been updated, the control module 26 will proceed from step 608 in FIG. 27B through steps 611, 612, 613, and 609, and will display the updated Japanese text source document while automatically producing a new English translation in the background.

Differing somewhat from the preceding embodiments, the ninth embodiment does not translate a document retrieved for the first time unless requested to do so by the user. However, the user can make this request by operating the "Translation" button as soon as he sees that the document is in a foreign language so the translation process can start with little delay. Moreover, once a user has a document translated, the control module 26 will keep the translation up to date by automatically having the document retranslated each time an updated version of the source document is retrieved. Furthermore, when a valid translation is present in the translation store 28, it will be displayed immediately.

Although the ninth embodiment does not solve the problem of the same translation being performed repeatedly at different user sites, it solves the other problems pointed out in the prior art. Specifically, the user does not have to transfer documents between different systems, he can obtain a translation of a document simply by operating the "Translation" button, thereby starting the translation process with little delay, he can retrieve further linked documents simply by selecting tagged items in the translated document, and the system will keep the translation up to date automatically.

Since translations can be made in both directions, the ninth embodiment is useful to speakers of both of the languages translated by the translation module 27. This feature is particularly advantageous when users with different native languages share the same computer.

When speakers of the same language share the same computer, they have automatic access to each other's translations, so to that extent, needless duplication of translation is eliminated.

Tenth embodiment

The tenth embodiment combines features of the second and ninth embodiments, performing all translations at the user's site, into a fixed target language.

The equipment configuration of the tenth embodiment is the same as in the ninth embodiment, shown in FIG. 26, but the processing executed by the client device 25 differs. The linked document translation module 27 in the tenth embodiment is adapted to translate one or more languages into the target language. The screens displayed in the tenth embodiment are as shown in FIGS. 28 to 33, except that there are no "Translation" and "Source text" buttons.

Figure 35:
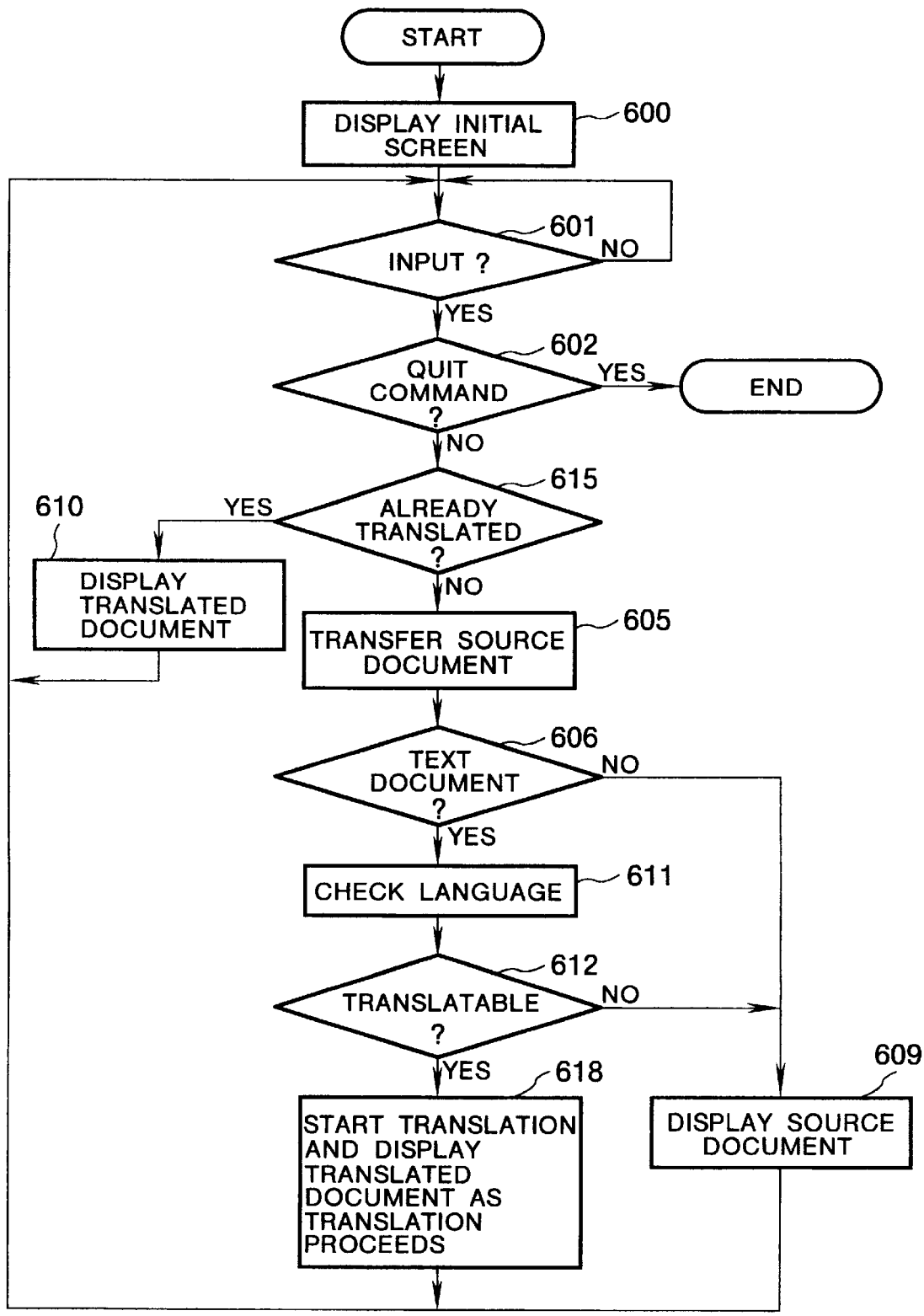
FIG. 35 is a flowchart illustrating a process executed by the control module in a tenth embodiment.

FIG. 35 illustrates the process executed by the control module 26 in the tenth embodiment, showing the same reference numerals as in FIGS. 27A and 27B for identical or corresponding steps. Steps 600 to 602 are the same as in the ninth embodiment, so a description will be omitted.

When a file descriptor is received, instead of the "Quit" command, the control module 26 decides whether or not a translated document having the same descriptor is stored in the translation store 28 (step 613). If such a translated document is present, the control module 26 displays the translated document, which is in the fixed target language (step 610), then awaits further input (step 601).

If the translated document is not present, the control module 26 sends the file descriptor to the appropriate linked document server 5, 6, or 7 and receives tile source document (step 605). The control module 26 also decides whether or not the received source document is a text document (step 606). If the received source document is not a text document, the control module 26 displays it (step 609) and awaits further input (step 601).

If the received source document is a text document, the control module 26 checks its language (step 611) and decides whether the language is translatable (step 612). If the source document is in the fixed target language, or is in another language that the linked document translation module 27 cannot translate, the control module 26 displays the received source document (step 609) and awaits further input (step 601).

If the received document is not in the fixed target language but is in a language that the linked document translation module 27 can translate, the control module 26 activates the linked document translation module 27, starts the translation process, and displays the translated document as the translation proceeds (step 618). As the translation is proceeding, the control module 26 also awaits further input (step 601).

In the tenth embodiment all translations are produced automatically, without the user's having to operate a "Translation" button, and all documents are displayed in the fixed target language if possible.

A difference between the tenth embodiment and the preceding embodiments is that in the tenth embodiment, one e a document is translated, if the document is retrieved again, the control module 26 will fetch tile translated document directly from the translation store 28, without retrieving the source document from the linked document store 8, 9, or 10.

This feature minimizes the amount of document transfer, and has the advantage of presenting existing translations to the user as quickly as possible, but permits translated documents to go out of date without the user's knowledge. Accordingly, the "Retransfer" button in the tenth embodiment is preferably adapted so that if it is operated when a completed translation is on display, the control module 26 receives a command to retrieve the source document from the linked document store 8, 9, or 10. Upon receiving the header of the source document, the control module 26 compares it with the header of the translated document, and has the document retranslated if necessary. (These steps were omitted from FIG. 35, but similar steps were carried out in the first eight embodiments.) A user who wishes to confirm whether an existing translation is up to date can then do so easily, by operating the "Retransfer" button.

Variations

The invention is not limited to the embodiments described above. Various features of these embodiments can be combined to obtain further embodiments. The number of possible combinations of this type is too numerous to list fully, but a few of them will be mentioned below, together with other possible modifications.

In the first embodiment, when the user used a tagged item in a translated document to retrieve a further document, he was always first shown that further document in its source language, even if the further document had already been translated, but the control module could be modified to show the translated version of the further document, as in the fifth or ninth embodiment.

As noted in the fifth to eighth embodiments, linked document translation systems can also be provided at sites C and D, for the convenience of users who access the network through those sites. To avoid needless duplication of translation, the control modules of the linked document translation systems can be adapted to search the storage facilities in the linked document translation systems at other sites when checking the existence of translated documents. Alternatively, a common directory of the storage facilities of the linked document translation systems at all sites can be maintained.

In the fifth to eighth embodiments, it is not necessary to copy source documents retrieved from the linked document store 8 at site B into the separate storage facilities of the linked document translation system 12. The control module 14 can be adapted to take these source documents from the linked document store 8, add the necessary "Translation" buttons, and have the embedded tags modified when the source documents are transferred to the client device 1.

The ninth embodiment could be modified to translate documents when first retrieved, as in the other embodiments, instead of waiting for the user to operate the "Translation" button.

The tenth embodiment could be modified to allow the user to select the target language, as in the second and sixth embodiments.

The first four embodiments, and the ninth and tenth embodiments, could be provided with a mode that bypassed the translation process and simply retrieved the requested document, as in the fifth to eighth embodiments. Conversely, the fifth to eighth embodiments could be adapted so that the linked document translation system is always activated.

The first eight embodiments were described as placing "Source text" or "Translation" buttons directly in translated documents stored in the linked document translation system. These buttons need not be stored in the documents themselves, however, they can be added when the document is displayed.

Instead of just storing translated documents, the translation systems in the first four embodiments, and in the sixth, ninth and tenth embodiments, could be provided with facilities for storing retrieved source documents as well, so as to present these documents more quickly if requested later, as in the fifth, seventh, and eighth embodiments.

Any of the embodiments can be adapted to translate from one language into another language through an intermediate language. The fourth embodiment, for example, can translate from Russian to German by having the first translation module 4J translate a Russian source document into Japanese, then having the third translation module 4D translate the resulting Japanese document into German. More generally, a translation module is not limited to a single machine translation system, but can comprise a combination of two (or more) existing machine translation systems.

The control module does riot have to be located at the same site as the translation module. The control module in the ninth or tenth embodiment, for example, could be adapted to access a translation module located at site B, C, or D. The translated documents should then also be stored at site B, C, or D, making them available to other users whose computer systems have similar control modules. In general the control module can be located at a translation control site in the communication network, and the translation module and translation storage facilities can be located at a separate translation site elsewhere in the same communication network.

Different control modules could be provided for translation into different languages, instead of having a single control module for all languages.

The initial input screens are, of course, not limited to those shown in the drawings. Input and display screens of any type, including the types found in conventional document retrieval and display systems, can be employed.

In any of the preceding embodiments, the frequency with which the source document is retrieved from the linked document stores 8, 9, and 10 can be varied. The extreme cases were given in the first embodiment, which retrieved the source document at every opportunity, and the tenth embodiment, which never retrieved the source document if a locally stored (translated) version was available. Many schemes intermediate between these two extremes are possible, including but not limited to the schemes in the fifth to ninth embodiments. The retrieval scheme can also be adapted to fit the update schedules of particular documents, if known.

The invention is not limited to any particular set of languages, or any number of languages. The ninth embodiment, for example, could be modified to translate among more than two languages, as in the fourth and eighth embodiments.

A system capable of translating documents into more than one language does not have to translate all documents into all possible languages. For example, the system could be adapted to translate documents between certain pairs of languages on its own initiative, and between certain other pairs of languages only when so requested by the user.

While particularly useful in linked document retrieval and display systems, the present invention can of course be practiced in retrieval and display systems for ordinary (non-linked) documents.

Those skilled in the art will recognize that further modifications are possible without departing from the scope claimed below.

What is claimed is:

1. A document retrieval and display system for retrieving source documents in different languages from a plurality of servers located at different sites in a communication network, translating at least one of the received documents, and displaying the source documents and the translated documents at a client device connected to the communication network, said system comprising:

a translation module for translating documents between at least two of the languages by machine;

a storage facility coupled to said translation module for storing the translated documents produced by said translation module; and a control module coupled to said translation module for causing the source documents to be retrieved from the servers, transferred to the client device, and displayed at the client device, and for automatically causing said translation module to begin translating at least one of the source documents retrieved from the servers as soon as the source documents have been retrieved, for causing the translation of the source documents to proceed while the source documents are being displayed at the client device, for causing the resulting translated documents to be placed in said storage facility, for receiving requests for translation from the client device, and for causing the client device to display the translated documents in response to the requests for translation.

2. A system as claimed in claim 1, wherein said control module is disposed at one of the sites and is coupled to a corresponding one of the servers.

3. A system as claimed in claim 1, wherein said control module is disposed at the client device.

4. A system as claimed in claim 1, wherein the documents are linked documents provided with tags permitting one document to be retrieved from another document by selection of items associated with the tags.

5. A system as claimed in claim 4, wherein said translation module is adapted to, when translating a first document, having tags, from a first language to create a second document in a second language, transfer the tags of the first document to the second document, thereby enabling the further documents to be retrieved from the second document.

6. A system as claimed in claim 5, further comprising a tag modifier for modifying the tags transferred to the second document by adding commands so that when the further documents are retrieved from the second document, the further documents will also be translated from the first language to the second language.

7. A system as claimed in claim 1, wherein said control module is disposed on the communication network between the client device and the servers, and said control module is adapted to allow communication between the client device and the servers.

8. A system as claimed in claim 1, wherein:

when said control module causes a source document to be retrieved from one of said servers, said control module also checks whether a translated document, translated by said translation module from said source document, has already been stored in said storage facility; and if said translated document has already been stored in said storage facility, said control module responds to a request for translation of said source document from said client device by causing the translated document stored in said storage facility to be displayed at said client device.

9. A system as claimed in claim 8, wherein said control module is adapted to determine whether the source document has been updated since being translated, and to cause said translation module to translate the source document again if the source document has been updated.

10. A system as claimed in claim 1, wherein said storage facility is adapted to store the source documents retrieved from the servers, and said control module is adapted to cause the client device to display at least one of the source documents thus stored in said storage facility when the source documents are requested again by the client device.

11. A system as claimed in claim 1, wherein said control module is adapted to cause said translation module to translate the source documents into a single target language.

12. A system as claimed in claim 11, wherein the single target language is selectable at the client device.

13. A system as claimed in claim 1, wherein said control module is adapted to cause said translation module to translate the source documents into more than one language.

14. A system as claimed in claim 13, wherein said control module is adapted to cause said translation module to translate the source documents into all languages into which said translation module is capable of translating the source documents.

15. A system as claimed in claim 1, wherein said control module is adapted to, before causing a translated document stored in said storage facility to be displayed at the client device, always cause a source document from which the translated document was translated to be retrieved again, check whether the source document has been updated, and have the source document retranslated by said translation module if the source document has been updated.

16. A system as claimed in claim 1, wherein said control module is adapted to be enabled and displayed by an input at the client device.

17. A method of retrieving, translating, and displaying source documents stored in different languages in computing systems at different server sites interconnected by a communication network, said method comprising:

receiving, at a translation control site in the communication network, input from a client device at a user site in the communication network requesting a source document in a first language;

retrieving the source document from one of the server sites via the communication network and transferring the source document to the translation control site;

displaying the source document at the client device;

determining whether an old translated document, translated previously from the source document into a second language different from the first language, is stored at a translation site in the communication network;

automatically activating a translation module at the translation site if no such translated document is stored at the translation site, and having the translation module translate the source document from the first language into the second language, wherein the translation of the source document proceeds while the source document is displayed at the client device, thereby producing a new translated document;

storing the new translated document at the translation site;

receiving a request for translation of the document from the first language to the second language from the client device;

displaying the old translated document at the client device if the old translated document is stored at the translation site; and displaying the new translated document at the client device if the old translated document is not stored at the translation site.

18. A method as claimed in claim 17, wherein the translation control site is disposed on the communication network between the user site and the server sites, and the client device communicates with the server sites through the translation control site.

19. A method as claimed in claim 17, wherein the translation control site is disposed at one of the server sites.

20. A method as claimed in claim 17, wherein the translation control site is disposed at the user site.

21. A method as claimed in claim 17, wherein when the old translated document is found to be stored at the translation site, said method further comprises:

determining whether the source document has been updated since the old translated document was created;

automatically activating the translation module, if the source document has been updated since the old translated document was created, and having the translation module translate the source document again from the first language into the second language, thereby producing the new translated document; and storing the new translated document at the translation site in place of the old translated document.

22. A method as claimed in claim 17, further comprising:

storing the source document at the translation site; and displaying, at the client device, the source document thus stored at the translation site if the client device requests retrieval of the source document again in the first language.

23. A method as claimed in claim 17, wherein the second language is a fixed target language.

24. A method as claimed in claim 23, further comprising designating the second language by an input at the client device.

25. A method as claimed in claim 17, wherein the translation module is capable of translating among more than two languages, said method further comprising:

having the translation module translate the source document into at least one language other than the first language and the second language while the translation module is also translating the source document into the second language.

26. A method as claimed in claim 17, wherein the source document is a linked document provided with tags for retrieving further source documents.

27. A method as claimed in claim 26, further comprising transferring the tags from the source document to the new translated document, thereby enabling the further documents to be retrieved by means of the tags in the new translated document.

28. A method as claimed in claim 27, further comprising modifying the tags by adding commands so that when the further source documents are retrieved, if the old translated documents corresponding to the further source documents are not stored at the translation site, the further source documents will automatically be translated from the first language to the second language by the translation module.

* * * * *